United States Patent
Hakata et al.

(10) Patent No.: US 10,432,895 B2
(45) Date of Patent: Oct. 1, 2019

(54) COMMUNICATION TERMINAL, IMAGE COMMUNICATION SYSTEM COMMUNICATION METHOD, AND NON-TRANSITORY RECORDING MEDIUM

(71) Applicant: Ricoh Company, Ltd., Tokyo (JP)

(72) Inventors: Mayu Hakata, Kanagawa (JP); Yohhei Ohmura, Kanagawa (JP); Takuya Soneda, Kanagawa (JP); Kenichiro Morita, Tokyo (JP); Takeshi Homma, Kanagawa (JP); Hiroyuki Kanda, Kanagawa (JP); Takafumi Takeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/103,344

(22) Filed: Aug. 14, 2018

(65) Prior Publication Data
US 2019/0082144 A1    Mar. 14, 2019

(30) Foreign Application Priority Data

Sep. 12, 2017   (JP) ................................. 2017-175146

(51) Int. Cl.
  *H04N 7/15*    (2006.01)
  *H04N 13/349*  (2018.01)
  (Continued)

(52) U.S. Cl.
  CPC .............. *H04N 7/15* (2013.01); *H04N 7/142* (2013.01); *H04N 7/147* (2013.01);
  (Continued)

(58) Field of Classification Search
  USPC ....................................................... 348/14.02
  See application file for complete search history.

(56) References Cited

U.S. PATENT DOCUMENTS

| | | | |
|---|---|---|---|
| 2008/0247636 A1* | 10/2008 | Davis | G06T 19/00 382/152 |
| 2009/0160996 A1* | 6/2009 | Yamaoka | G06T 5/006 348/333.11 |

(Continued)

FOREIGN PATENT DOCUMENTS

| | | |
|---|---|---|
| JP | 2007-221437 | 8/2007 |
| JP | 2013-250830 | 12/2013 |
| JP | 2018-110354 | 7/2018 |

OTHER PUBLICATIONS

U.S. Appl. No. 15/879,503, filed Jan. 25, 2018, Kenichiro Morita, et al.

*Primary Examiner* — Amal S Zenati
(74) *Attorney, Agent, or Firm* — Xsensus LLP

(57) ABSTRACT

A communication terminal includes circuitry to cause a display to display a predetermined area image. The predetermined area image is an image of a part of a whole image that is shared with another communication terminal communicably connected to the communication terminal. The circuitry further transmits predetermined area information to be received by the other communication terminal. The predetermined area information indicates a predetermined area associated with the predetermined area image displayed with the display.

12 Claims, 28 Drawing Sheets

(51) Int. Cl.
*H04N 7/14* (2006.01)
*H04M 1/725* (2006.01)
*H04N 5/232* (2006.01)

(52) U.S. Cl.
CPC ........ *H04N 13/349* (2018.05); *H04M 1/7253* (2013.01); *H04N 5/23238* (2013.01)

(56) References Cited

U.S. PATENT DOCUMENTS

| | | |
|---|---|---|
| 2018/0097682 A1 | 4/2018 | Yoshida et al. |
| 2018/0098105 A1 | 4/2018 | Morita et al. |
| 2018/0191787 A1 | 7/2018 | Morita et al. |

\* cited by examiner

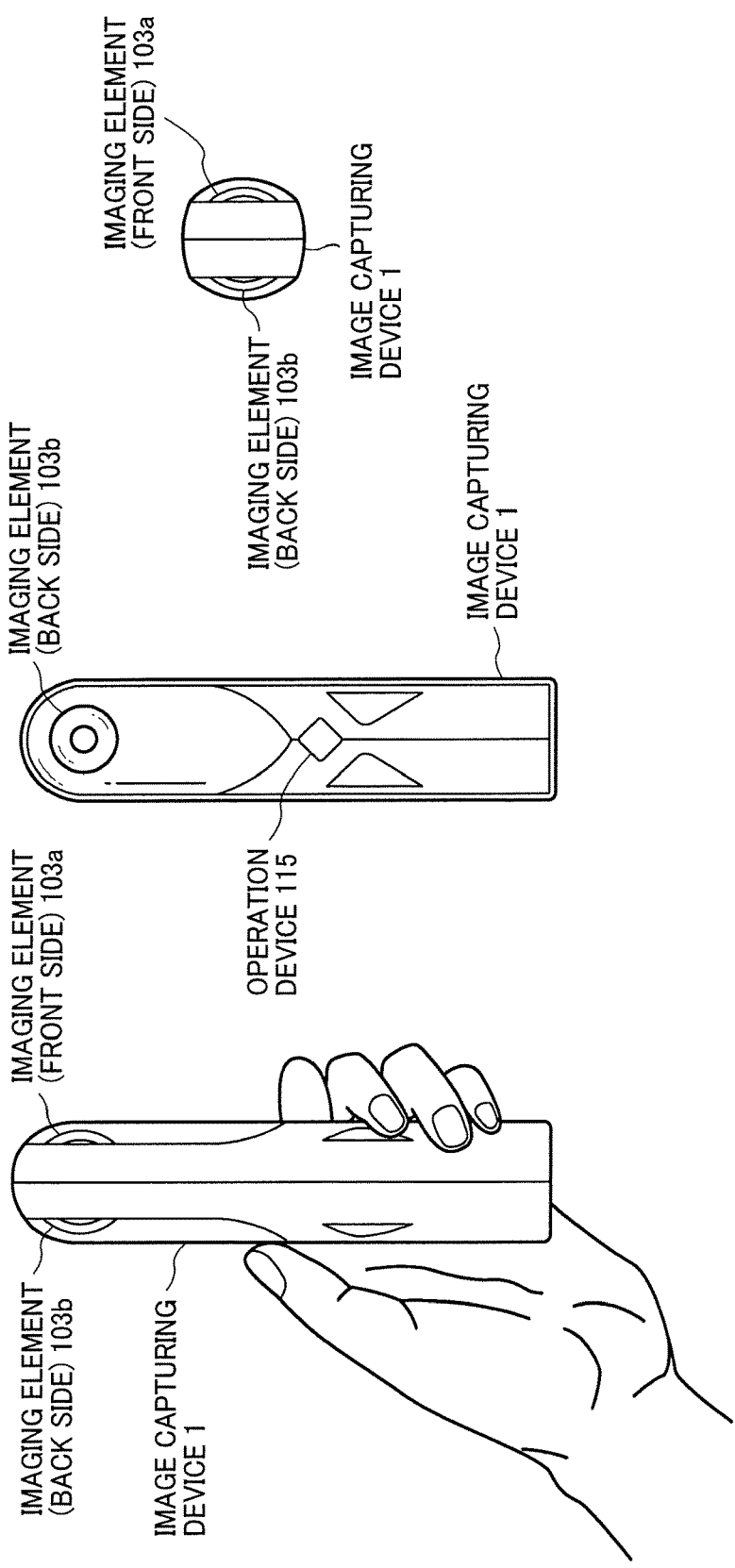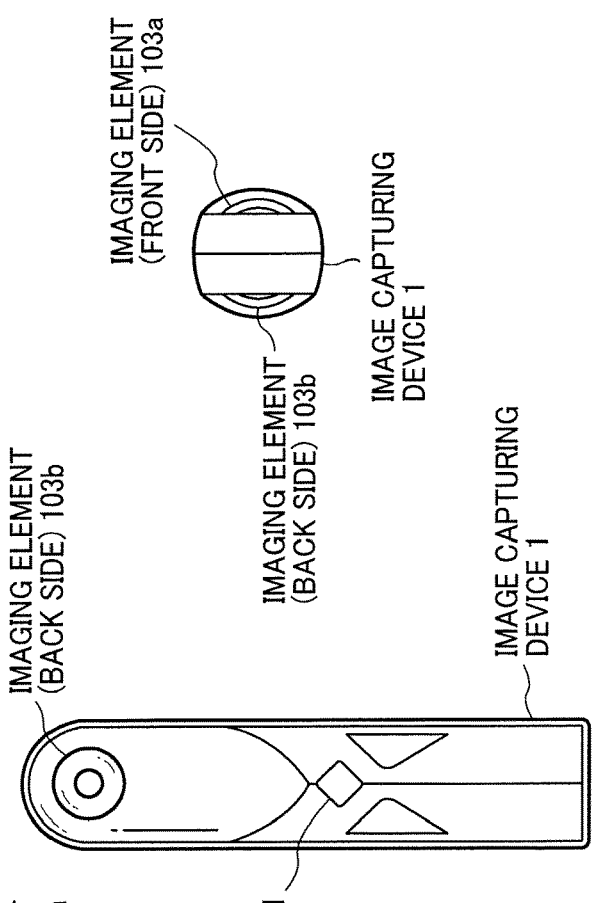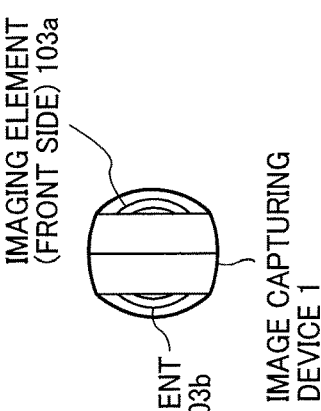

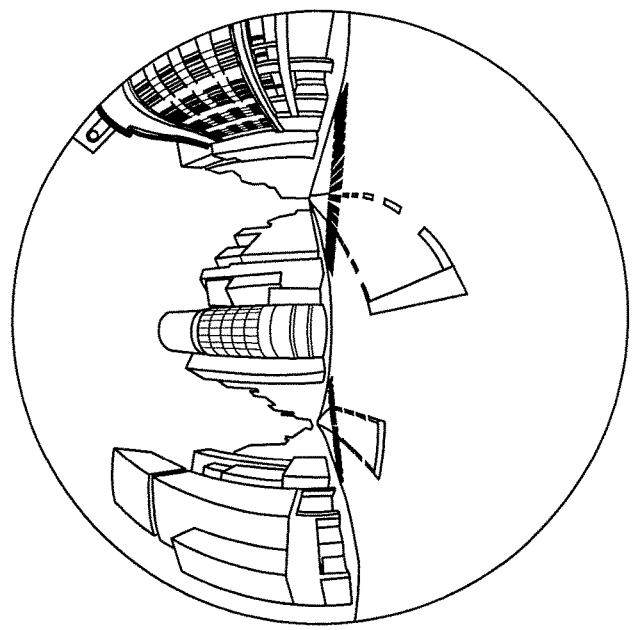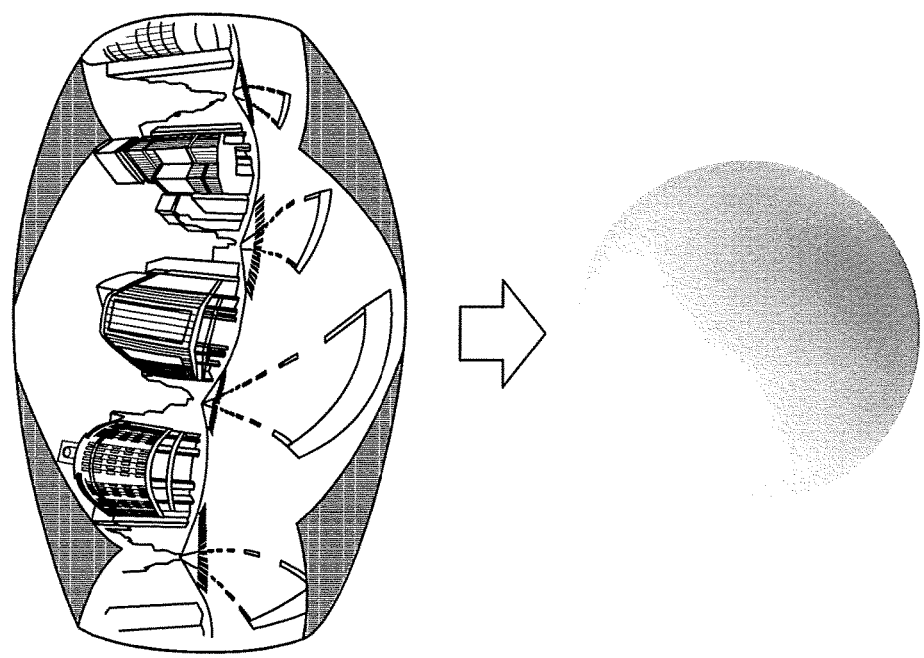

FIG. 16

| IMAGE DATA ID | IP ADDRESS OF TRANSMISSION SOURCE TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 17

| VENDER ID AND PRODUCT ID OF IMAGE CAPTURING DEVICE |
|---|
| vid_05ca&pid_2711 |
| vid_05ca&pid_3822 |
| ... |

FIG. 18

| IP ADDRESS OF IMAGE TRANSMISSION SOURCE | IP ADDRESS OF IMAGE TRANSMISSION SOURCE (IP ADDRESS OF TRANSMISSION SOURCE OF PREDETERMINED AREA INFORMATION) | PREDETERMINED AREA INFORMATION | | |
|---|---|---|---|---|
| | | RADIUS ($r$) | POLAR ANGLE ($\theta$) | ANGLE OF ORIENTATION ($\phi$) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

| SESSION ID | IP ADDRESS OF PARTICIPANT COMMUNICATION TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 20

| SESSION ID | IMAGE DATA ID | IP ADDRESS OF TRANSMISSION SOURCE TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 21

| IP ADDRESS OF IMAGE TRANSMISSION SOURCE | IP ADDRESS OF IMAGE TRANSMISSION DESTINATION | PREDETERMINED AREA INFORMATION | | |
|---|---|---|---|---|
| | | RADIUS ($r$) | POLAR ANGLE ($\theta$) | ANGLE OF ORIENTATION ($\phi$) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | ... | ... | ... |

# COMMUNICATION TERMINAL, IMAGE COMMUNICATION SYSTEM COMMUNICATION METHOD, AND NON-TRANSITORY RECORDING MEDIUM

CROSS-REFERENCE TO RELATED APPLICATION

This patent application is based on and claims priority pursuant to 35 U.S.C. 119(a) to Japanese Patent Application No. 2017-175146, filed on Sep. 12, 2017, in the Japan Patent Office, the entire disclosure of which is hereby incorporated by reference herein.

BACKGROUND

Technical Field

Embodiments of the present disclosure relate to a communication terminal, an image communication system, a communication method, and a non-transitory recording medium.

Related Art

Remote conference systems, such as videoconference systems, are now in widespread use, enabling users to remotely attend a conference that is held among different sites via a communication network such as the Internet. In such a remote conference system, a communication terminal for a remote conference system is provided in each site such as a conference room where one or more attendants are. The communication terminal collects video images of the room including the attendants and sounds such as voice of the attendants and converts the collected video images and the collected sounds into digital data, separately, to be transmitted to another communication terminal that is provided in a different site (room) where other one or more attendants are. Based on the transmitted digital data, the other communication terminal displays images on a display or outputs sounds from a speaker in the different room to establish a video call. As described above, a conference held among different sites is held like a usual conference held in one site (room).

Additionally, the communication terminal is connectable with an image capturing device that can capture a spherical image to be transmitted to the other communication terminal in real time. The other communication terminal displays, on the display, a predetermined area image, which is an image of a predetermined area that is a part of the spherical image. Accordingly, the user in each site can determine a predetermined area image representing an image of a predetermined area of the spherical image to be displayed.

SUMMARY

An exemplary embodiment includes a communication terminal including circuitry. The circuitry causes a display to display a predetermined area image. The predetermined area image is an image of a part of a whole image that is shared with another communication terminal communicably connected to the communication terminal. The circuitry further transmits predetermined area information to be received by the other communication terminal. The predetermined area information indicates a predetermined area associated with the predetermined area image displayed with the display.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an image capturing device according to one of the embodiments;

FIG. 1B is a front view of the image capturing device according to the one of the embodiments;

FIG. 1C is a plan view of the image capturing device according to the one of the embodiments;

FIG. 4A is an illustration of a Mercator image covering a sphere, according to the one of the embodiments;

FIG. 4B is an illustration of a spherical image, according to the one of the embodiments;

FIG. 16 is a conceptual diagram illustrating an image type management table, according to the one of the embodiments;

FIG. 17 is a conceptual diagram illustrating an image capturing device management table, according to the one of the embodiments;

FIG. 18 is a conceptual diagram illustrating a predetermined area management table, according to the one of the embodiments;

FIG. 19 is a conceptual diagram illustrating a session management table, according to the one of the embodiments;

FIG. 20 is a conceptual diagram illustrating another image type management table, according to the one of the embodiments;

FIG. 21 is a conceptual diagram illustrating another predetermined area management table, according to the one of the embodiments;

Figure 2:
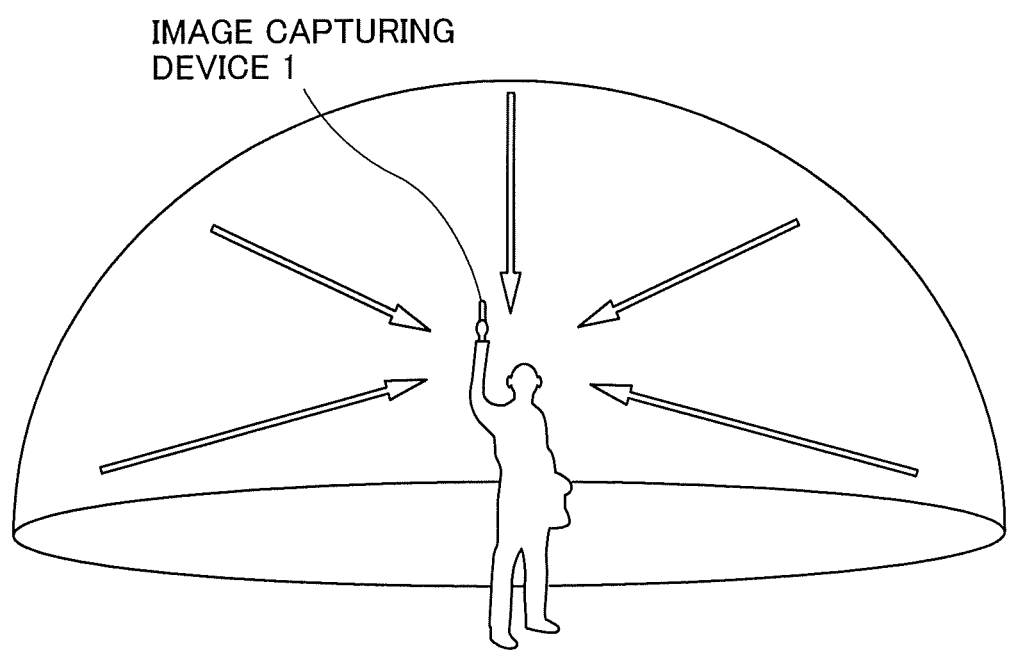
FIG. 2 is an illustration of how a user uses the image capturing device according to the one of the embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of an embodiment of the present disclosure with reference to the attached drawings.

<Overview of Embodiment>
<Method of Generating Spherical Image>

A description is given of a method of generating a spherical image with reference to FIG. 1A to FIG. 7.

A description is given below of an external view of an image capturing device 1 with reference to FIG. 1A to FIG. 1C. The image capturing device 1 is a digital camera that captures an image (captured image) that is to be a three dimensional spherical (360-degree) image. FIG. 1A is a left side view of the image capturing device 1. FIG. 1B is a front view of the image capturing device 1. FIG. 1C is a plan view of the image capturing device 1.

As illustrated in FIG. 1A, the image capturing device 1 can be held by a single hand. Referring to FIG. 1A, FIG. 1B, and FIG. 1C, the image capturing device 1 is provided with an imaging element 103a on a front side (anterior side) and an imaging element 103b on a back side (rear side) in an upper section. The imaging elements (image sensors) 103a and 103b are used in combination with optical members such as fisheye lenses 102a and 102b each of which is capable of capturing a hemispherical image having a field view of 180-degree or wider. A detailed description of the fisheye lenses 102a and 102b is deferred. As illustrated in FIG. 1B, the image capturing device 1 is also provided with an operation device 115 such as a shutter button on an opposite side of the front side.

A description is given of an example of how the image capturing device 1 is used, with reference to FIG. 2. FIG. 2 is an illustration of an example of how a user uses the image capturing device 1. As illustrated in FIG. 2, the image capturing device 1 is used for capturing subjects surrounding the user who is holding the image capturing device 1 in his or her hand, for example. The imaging elements 103a and 103b illustrated in FIG. 1A to FIG. 1C capture the subjects surrounding the user to obtain two hemispherical images.

Figure 3A:
FIG. 3A is an illustration of a hemispherical image, which is a front side, captured by the image capturing device according to the one of the embodiments.
Figure 3B:
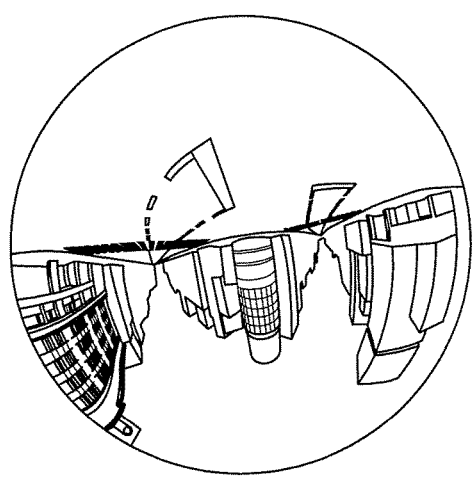
FIG. 3B is an illustration of another hemispherical image, which is a back side, captured by the image capturing device according to the one of the embodiments.
Figure 3C:
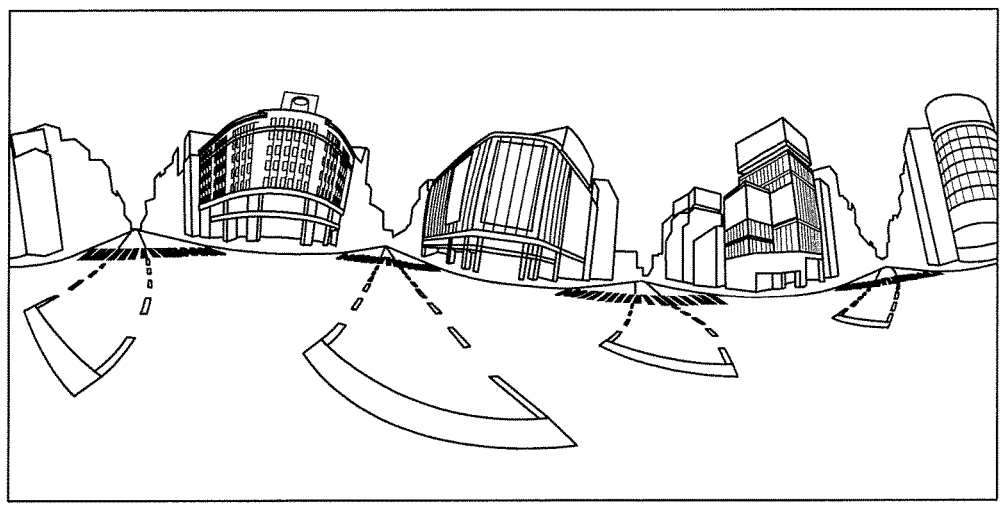
FIG. 3C is an illustration of an image represented by Mercator projection, according to the one of the embodiments.

Hereinafter, a description is given of an overview of a process of generating a spherical image from images captured by the image capturing device 1, with reference to FIG. 3A to FIG. 4B. FIG. 3A is an illustration of one of the two hemispherical images (front side), captured by the image capturing device 1. FIG. 3B is an illustration of the other one of the two hemispherical images (back side), captured by the image capturing device 1. FIG. 3C is an illustration of an image represented by Mercator projection. The image represented by Mercator projection as illustrated in FIG. 3C is, hereinafter, referred to as a "Mercator image". FIG. 4A is an illustration of a Mercator image covering a sphere. FIG. 4B is an illustration of a spherical image.

As illustrated in FIG. 3A, an image captured by the imaging element 103a becomes a curved hemispherical image (front side) due to the fisheye lens 102a, which is described later. Additionally, as illustrated in FIG. 3B, an image captured by the imaging element 103b becomes a curved hemispherical image (back side) due to the fisheye lens 102b, which is described later. The image capturing device 1 combines the one hemispherical image (front side) and the other hemispherical image (back side), which is reversed by 180-degree from the one hemispherical image (front side), to generate the Mercator image as illustrated in FIG. 3C.

The Mercator image is attached on the sphere surface to cover the sphere surface using Open Graphics Library for Embedded Systems (OpenGL ES) as illustrated in FIG. 4A, and thus the spherical image as illustrated in FIG. 4B is generated. In other words, the spherical image is represented as an image of which the Mercator image faces toward the center of the sphere. It should be noted that OpenGL ES is a graphic library used for visualizing two-dimensional (2D) data and three-dimensional (3D) data. The spherical image is either a still image or a video image.

As described above, the spherical image is an image covering and being attached to the sphere surface. Accordingly, some may feel very uncomfortable to see such an image. To cope with this, a part of the spherical image is displayed as a planar image having fewer curves. The part of the spherical image displayed as a planar image is referred to as a predetermined area. The predetermined area may be previously set, such that a specific part of the spherical image is made viewable to the user. Additionally, the predetermined area may also be selectable, or settable according to a user instruction. The displayed planar image corresponding to the predetermined area is, hereinafter, referred to as a "predetermined area image". Hereinafter, a description is given of displaying a predetermined area image with reference to FIG. 5, FIG. 6A and FIG. 6B.

Figure 5:
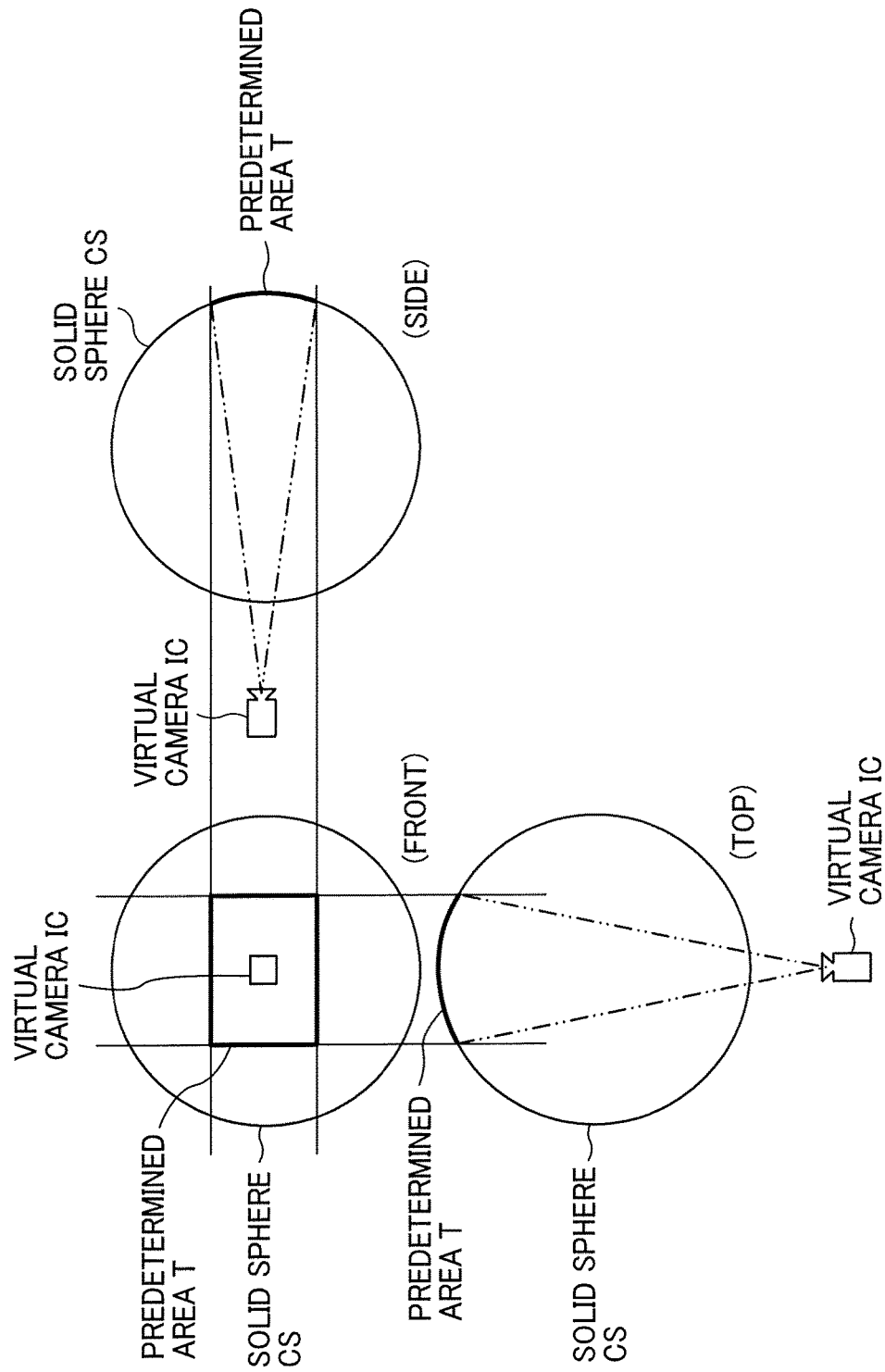
FIG. 5 is an illustration of a positional relation between a virtual camera integrate circuit (IC) and a predetermined area T in a case where a spherical image is represented as a three-dimensional solid sphere, according to the one of the embodiments.
Figure 6A:
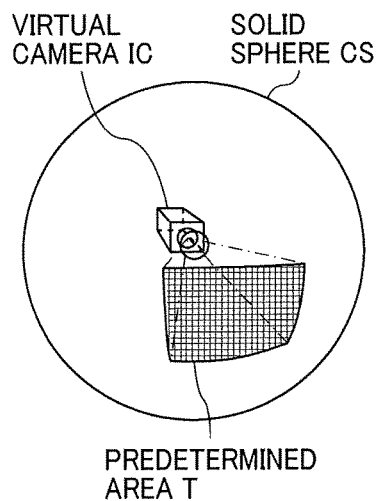
FIG. 6A is a perspective view of FIG. 5, according to the one of the embodiments.
Figure 6B:
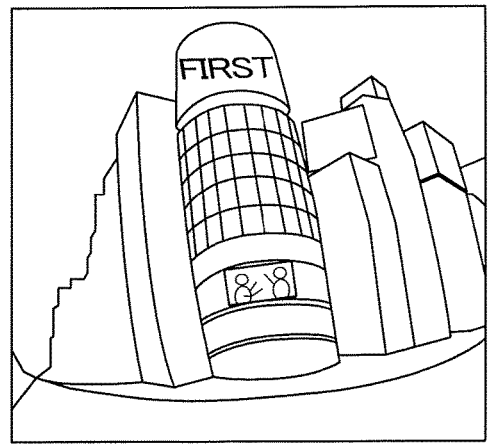
FIG. 6B is an illustration of a predetermined area image displayed on a display of a communication terminal according to the one of the embodiments.

FIG. 5 is an illustration of a positional relation between a virtual camera IC and the predetermined area T when the spherical image is represented as a three-dimensional solid sphere. The virtual camera IC corresponds to a position of a point of view (viewpoint) of a user who is viewing the spherical image represented as a three-dimensional solid sphere. FIG. 6A is a perspective view of FIG. 5. FIG. 6B is an illustration of the predetermined area image displayed on a display. In FIG. 6A, the spherical image illustrated in FIG. 4B is represented as a three-dimensional solid sphere CS. When the generated spherical image is the solid sphere CS, the virtual camera IC is outside of the spherical image, as illustrated in FIG. 5. The predetermined area T in the spherical image is an imaging area of the virtual camera IC. The predetermined area T is specified by predetermined area information indicating a position coordinate (x, y, field angle α) including a field angle of the virtual camera IC in a three-dimensional virtual space having the spherical image. Zooming of the predetermined area T is implemented by enlarging or reducing a range (arc) of the field angle α. Alternatively, zooming of the predetermined area T is implemented by moving the virtual camera IC toward or away from the spherical image.

The predetermined area image, which is an image of the predetermined area T illustrated in FIG. 6A, is displayed as an imaging area of the virtual camera IC, as illustrated in FIG. 6B. The image illustrated in FIG. 6B is the predetermined area image represented by the predetermined area information that is set by default. In another example, a predetermined area image may be specified by an imaging area (X, Y, Z) of the virtual camera IC, i.e., the predetermined area T, rather than the predetermined area information, i.e., the position coordinate of the virtual camera IC. In the following description of the embodiment, the position coordinate of the virtual camera IC, (x(rH), y(rV), field angle α) is used.

Figure 7:
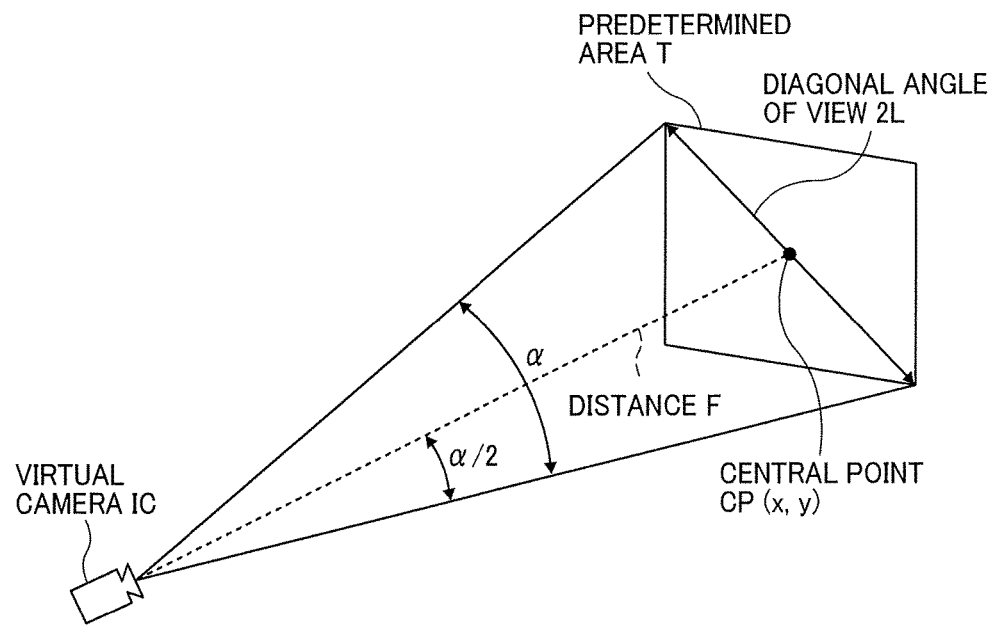
FIG. 7 is a diagram illustrating a relation between a predetermined area information and a predetermined area T, according to the one of the embodiments.

Hereinafter, a description is given of a relation between the predetermined area information and the predetermined area T with reference to FIG. 7. FIG. 7 is a diagram illustrating a relation between the predetermined area information and the predetermined area T, according to the embodiment. As illustrated in FIG. 7, a center point CP of 2L provides the parameters (x, y) of the predetermined area information. 2L denotes a diagonal angle of view of the predetermined area T specified the field view α of the virtual camera IC. Distance f is a distance from the virtual camera IC to the central point CP. Distance L is a distance between the center point CP and a given vertex of the predetermined area T (2L is a diagonal line). In FIG. 7, a trigonometric function equation generally expressed by the following equation (1) is satisfied.

$$L/f = \tan(\alpha/2) \quad \text{(Equation 1)}$$

Figure 8:
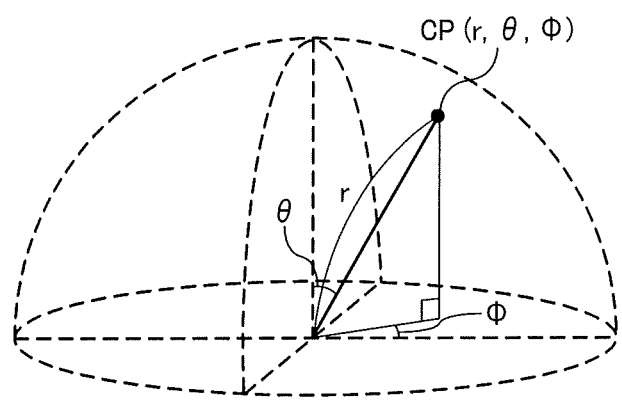
FIG. 8 is a diagram illustrating points in a three-dimensional Euclidean space according to spherical coordinates, according to the one of the embodiments.

FIG. 8 is a diagram illustrating points in a three-dimensional Euclidean space according to spherical coordinates, according to the embodiment. A positional coordinate (r, θ, φ) is given when the center point CP is represented by a spherical polar coordinates system. The positional coordinate (r, θ, φ) represents a radius, a polar angle, and an angle of orientation. The radius r is a distance from the origin of the three-dimensional virtual space including the celestial panoramic image to the center point CP and is equal to Distance f. This relation is illustrated in FIG. 8. In the following description is the embodiment, the positional coordinates (r, θ, φ) of the virtual camera IC is used.

<Overview of Image Communication System>

Figure 9:
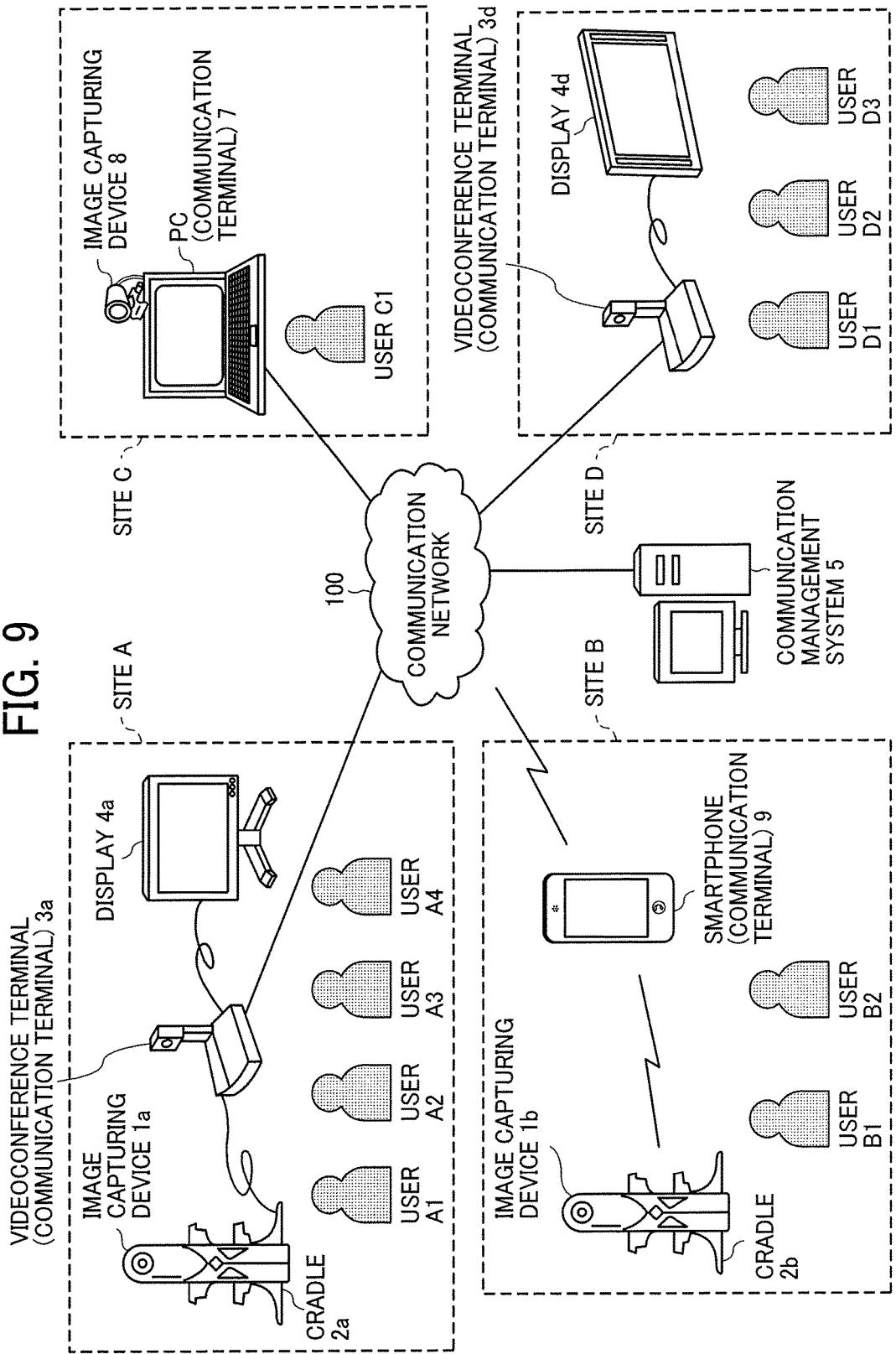
FIG. 9 is a schematic diagram illustrating a configuration of an image communication system according to the one of the embodiments.

Hereinafter, a description is given of an overview of a configuration of an image communication system according to the present embodiment with reference to FIG. 9. FIG. 9 is a schematic diagram illustrating a configuration of the image communication system according to the present embodiment.

As illustrated in FIG. 9, the image communication system according to the present embodiment includes an image capturing device 1a, an image capturing device 1b, a videoconference terminal 3a, a videoconference terminal 3d, a display 4a, a display 4d, a communication management system 5, a personal computer (PC) 7, an image capturing device 8, and a smartphone 9. The videoconference terminal 3a, the smartphone 9, the PC 7, and the videoconference terminal 3d communicate with one another via a communication network 100 such as the Internet. The communication network 100 is either a wireless network or a wired network.

Each of the image capturing device 1a and the image capturing device 1b is a special digital camera that captures an image including a subject or a view (surroundings) to obtain two hemispherical images from which a spherical image is generated, as described above. The image capturing device 8 is a general-purpose digital camera that captures an image of a subject or a view (surroundings) to obtain a general planar image.

Each of the videoconference terminal 3a and the videoconference terminal 3d is a terminal that is dedicated to a videoconference. The videoconference terminal 3a and the videoconference terminal 3d display, on the display 4a and the display 4d, respectively, a video image obtained by performing a video call via a wired cable such as a universal serial bus (USB). The videoconference terminal 3a usually captures an image by a camera 312, which is described later. However, in a case where the videoconference terminal 3a is connected to a cradle 2a on which the image capturing device 1a is mounted, the image capturing device 1a is preferentially used, and two hemispherical images, from which a spherical image is generated, are obtained. When a wired cable is used for connecting the videoconference terminal 3a and the cradle 2a, the cradle 2a supplies power to the image capturing device 1a and holds the image capturing device 1a in addition to establishing a communication between the image capturing device 1a and the videoconference terminal 3a. In the present embodiment, the image capturing device 1a, the cradle 2a, the videoconference terminal 3a, and the display 4a are provided in the same site that is a site A. In addition, there are four users A1, A2, A3 and A4 in the site A, participating in a video call. In addition, the videoconference terminal 3d and the display 4d are provided in the same site that is a site D. In the site D, there are three users D1, D2, and D3 participating in the video call.

The communication management system 5 manages communication among the videoconference terminal 3a, the videoconference terminal 3d, the PC 7 and the smartphone 9 and manages types of image data (a general image type and a special image type) to be transmitted and/or received among the videoconference terminal 3a, the videoconference terminal 3d, the PC 7 and the smartphone 9. In other words, the communication management system 5 is a communication control system. In the description of the present embodiment, a spherical image is used as a special image, and a planar image is used as a general image. The communication management system 5 is provided in, for example, an office of a service provider that provides a video communication service. The communication management system 5 may be configured as a single computer. Alternatively, the communication management system 5 may be configured as a plurality of computers, and one or more units (functions, means, or storages) are arbitrarily assigned to each of the plurality of computers. That is, the communication management system 5 may be implemented by a plurality of servers that operate in cooperation with one another.

The PC 7 can perform a video call by connecting with the image capturing device 8. In the present embodiment, the PC 7 and the image capturing device 8 are provided in the same site that is a site C. There is one user, user C, participating in the video call in the site C.

The smartphone 9 includes a display 917, which is described later, and displays an image of the video call on the display 917. The smartphone 9 includes a complementary metal oxide semiconductor (CMOS) sensor 905, and usually captures an image using the CMOS sensor 905. In addition, the smartphone 9 is capable of obtaining data of two hemispherical images, which is the original image data of the spherical image, captured by the image capturing device 1b using a wireless communication such as Wireless Fidelity (Wi-Fi) and Bluetooth (registered trademark). When the wireless communication is used, a cradle 2b supplies power to the image capturing device 1b and holds the image capturing device 1b, but not establish a communication. In the present embodiment, the image capturing device 1b, the cradle 2b, and the smartphone 9 are provided in the same site that is a site B. In addition, there are two users, user B1 and user B2, participating in the video call in the site B.

Each of the videoconference terminal 3a, the videoconference terminal 3d, the PC 7 and the smartphone 9 is an example of a communication terminal. OpenGL ES is installed in each of the communication terminals to enable each of the communication terminals to generate predetermined area information that indicates a partial area of the spherical image, or to generate a predetermined area image from a spherical image that is transmitted from a different one of the communication terminals.

The arrangement of the terminals, apparatuses and users illustrated in FIG. 9 is just an example, and any other suitable arrangement will suffice. For example, an image capturing device capable of capturing a spherical image may be used in place of the image capturing device 8 in the site C. In addition, examples of the communication terminal also include a digital television, a smartwatch, and a car navigation device. In the following description, any arbitrary one of the image capturing device 1a and the image capturing device 1b is referred to as "image capturing device 1", and any arbitrary one of the videoconference terminal 3a and the videoconference terminal 3d is referred to as "videoconference terminal 3". In addition, any arbitrary one of the display 4a and the display 4d is, hereinafter, referred to as "display 4".

<Hardware Configuration of Example Embodiment>

Hereinafter, a description is given of hardware configurations of the image capturing device 1, the videoconference terminal 3, the communication management system 5, the PC 7, and the smartphone 9 according to the present embodiment, with reference to FIG. 10 to FIG. 13. The image capturing device 8 is a general-purpose camera, and a detailed description of the image capturing device 8 is omitted here.

<Hardware Configuration of Image Capturing Device 1>

Figure 10:
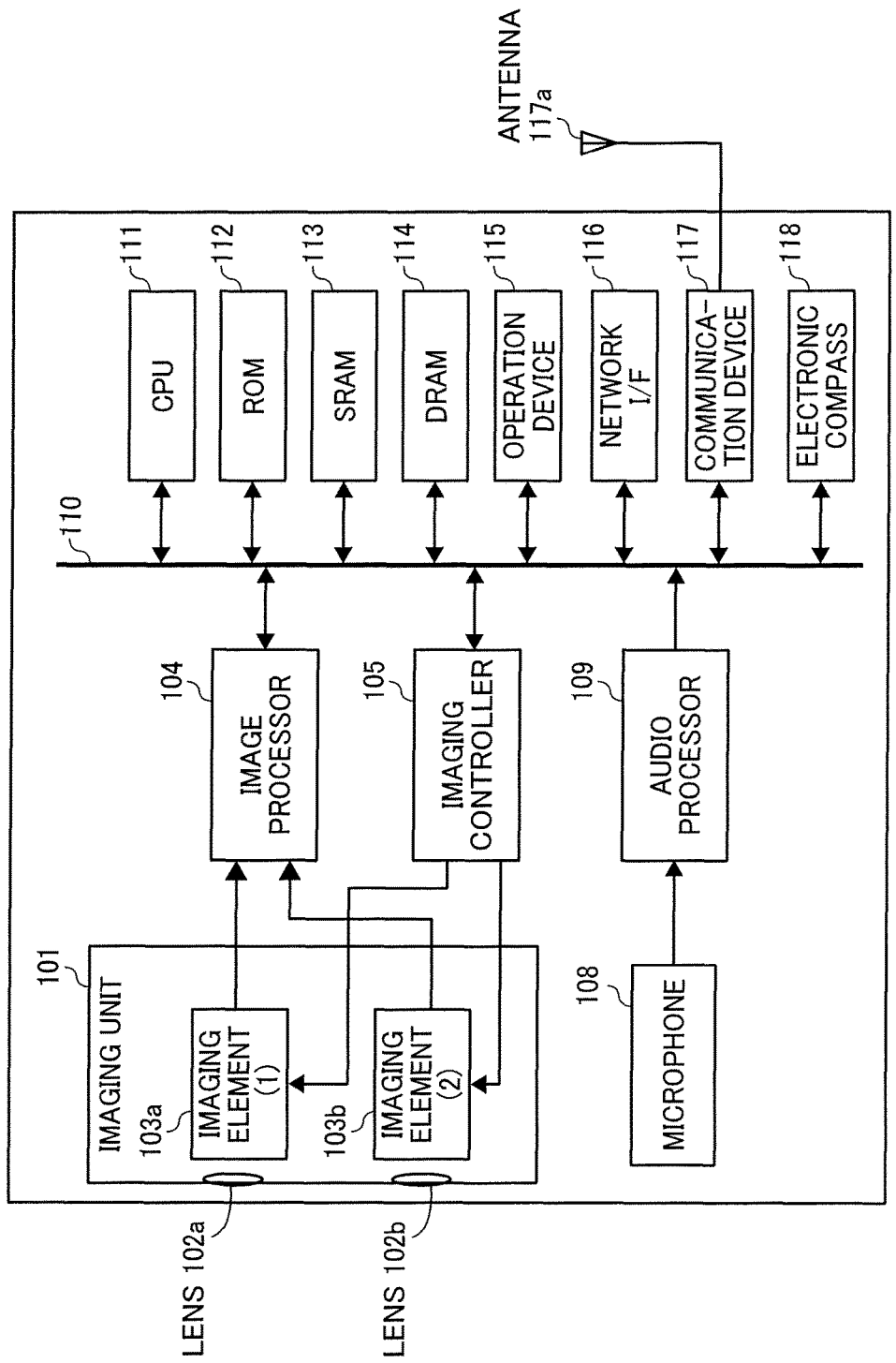
FIG. 10 is a block diagram illustrating a hardware configuration of the image capturing device according to the one of the embodiments.

A description is given of a hardware configuration of the image capturing device 1 according to the present embodiment with reference to FIG. 10. FIG. 10 is a block diagram illustrating an example of the hardware configuration of the image capturing device 1. In the following description, the image capturing device 1 is a spherical panoramic (omnidirectional) image capturing device having two imaging elements. However, the disclosure is not limited to this and the image capturing device 1 may include more than two imaging elements. In addition, the image capturing device 1 is not necessarily an image capturing device dedicated to omnidirectional image capturing, but may be a general-purpose digital camera or a smartphone to which an external omnidirectional image capturing unit is attachable to implement substantially the same function as the image capturing device 1 in the description of the present embodiment (omnidirectional image capturing device).

As illustrated in FIG. 10, the image capturing device 1 includes an imaging unit 101, an image processor 104, an image controller 105, a microphone 108, an audio processor 109, a central processing unit (CPU) 111, a read only memory (ROM) 112, a static random access memory (SRAM) 113, a dynamic random access memory (DRAM)

114, an operation device 115, a network interface (I/F) 116, a communication device 117, and an antenna 117a.

The imaging unit 101 includes two wide-angle lenses (so-called fisheye lenses) 102a and 102b each of which has a field angle that is equal to or greater than 180 degrees to form a hemispherical image. The imaging unit 101 further includes the two imaging elements 103a and 103b corresponding to the wide-angle lenses 102a and 102b, respectively. Each of the imaging elements 103a and 103b includes an image sensor, such as a CMOS sensor or a charge-coupled device (CCD) sensor, to convert an optical image formed by each of the fisheye lenses 102a and 102b into electric signals to output image data. Each of the imaging elements 103a and 103b also includes a timing generation circuit to generate horizontal or vertical synchronization signals and pixel clocks for the image sensor. In addition, each of the imaging elements 103a and 103b includes a group of registers in which various commands and parameters for the operation are set.

Each of the imaging elements 103a and 103b of the imaging unit 101 is connected to the image processor 104 through a parallel I/F bus. In addition, each of the imaging elements 103a and 103b of the imaging unit 101 is connected to the image controller 105 through a serial I/F bus such as an (I squared C/inter integrated circuit) I2C bus. Each of the image processor 104 and the image controller 105 is connected to the CPU 111 through a bus 110. Further, the ROM 112, the SRAM 113, the DRAM 114, the operation device 115, the network I/F 116, the communication device 117, and an electronic compass 118 are also connected to the bus 110.

The image processor 104 obtains image data from each of the imaging elements 103a and 103b through the parallel I/F bus and performs predetermined processing on the image data obtained from each of the imaging elements 103a and 103b separately, and combines the processed image data to generate data representing a Mercator image as illustrated in FIG. 3C.

The image controller 105 usually functions as a master device while each of the imaging elements 103a and 103b usually functions as a slave device, and the image controller 105 sets commands in the group of registers of each of the imaging elements 103a and 103b through the I2C bus. The image controller 105 receives necessary commands from the CPU 111. Further, the image controller 105 obtains status data of the group of registers of each of the imaging elements 103a and 103b through the I2C bus and transmits the status data to the CPU 111.

The image controller 105 instructs the imaging elements 103a and 103b to output the image data at a time when the shutter button of the operation device 115 is pressed. The image capturing device 1 may display a preview image on a display (e.g., a display of the videoconference terminal 3a) or may have a function of supporting displaying a video image. In this case, the image data is continuously output from the imaging elements 103a and 103b at a predetermined frame rate (frames per minute).

Furthermore, the image controller 105 operates in conjunction with the CPU 111 to synchronize times when the imaging elements 103a and 103b output the image data. In the present embodiment, the image capturing device 1 does not include a display unit (display), however the disclosure is not limited to this and the image capturing device 1 may include a display.

The microphone 108 converts sound into audio data (signals). The audio processor 109 obtains the audio data from the microphone 108 through an I/F bus and performs predetermined processing on the audio data.

The CPU 111 controls the image capturing device 1 and performs necessary processing. The ROM 112 stores various programs for the CPU 111. Each of the SRAM 113 and the DRAM 114 operates as a work memory to store programs executed by the CPU 111 or data being currently processed. More specifically, the DRAM 114 stores image data currently processed by the image processor 104 and processed data representing the Mercator image.

The operation device 115 collectively refers to various operation keys, a power switch, the shutter button, and a touch panel having functions of both displaying information and receiving input from a user, which may be used in combination. The user operates the operation keys to input various image capturing modes or image capturing conditions.

The network I/F 116 collectively refers to an interface circuit such as a USB I/F that enables the image capturing device 1 to communicate with an external media such as a secure digital (SD) card or an external personal computer. The network I/F 116 supports at least one of wired communication and wireless communication. The data representing the Mercator image, which is stored in the DRAM 114, can be stored in the external media through the network I/F 116 or transmitted to the external device such as the videoconference terminal 3a via the network I/F 116, as needed.

The communication device 117 communicates with an external device such as the videoconference terminal 3a via the antenna 117a of the image capturing device 1 by near distance wireless communication such as Wi-Fi and Near Field Communication (NFC). The communication device 117 may transmit the data representing the Mercator image to a device external to the videoconference terminal 3a.

The electronic compass 118 computes an orientation and a tilt (roll angle) of the image capturing device 1 based on the Earth magnetism to output orientation and tilt information. The orientation and tilt information is an example of related information, which is metadata described in compliance with Exif and is used for performing image processing, such as image correction, on captured image data. The related information also includes data of a time (date) when an image is captured by the image capturing device 1, and data of an amount of image data, for example.

<Hardware Configuration of Videoconference Terminal>

Figure 11:
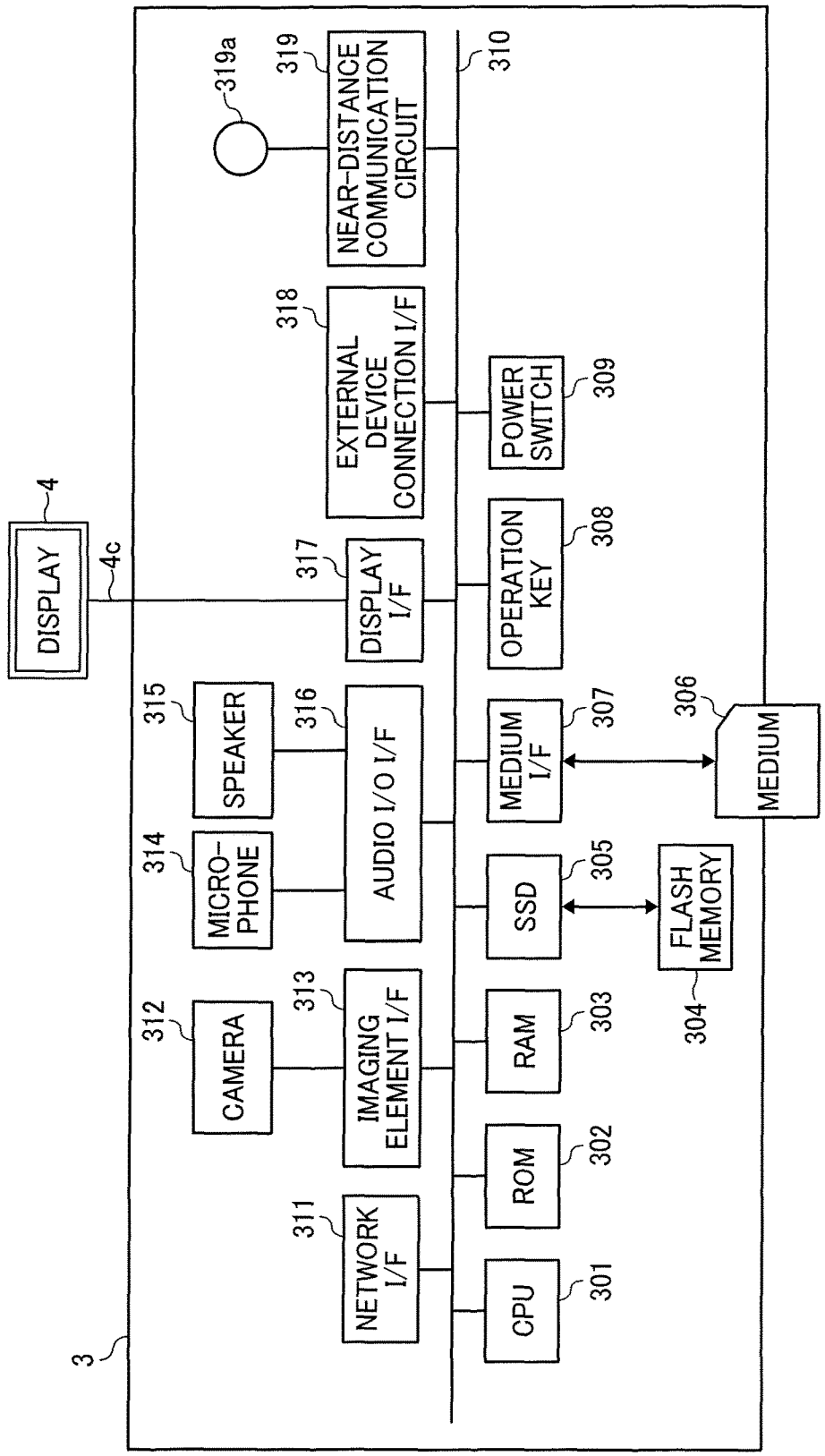
FIG. 11 is a block diagram illustrating a hardware configuration of a videoconference terminal according to the one of the embodiments.

Hereinafter, a description is given of a hardware configuration of the videoconference terminal 3 according to the present embodiment with reference to FIG. 11. FIG. 11 is a block diagram illustrating an example of the hardware configuration of the videoconference terminal 3. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output (I/O) interface 316, a display I/F 317, an external device connection I/F 318, a near-distance communication circuit 319, and an antenna 319a for the near-distance communication circuit 319.

The CPU 301 controls the entire operation of the videoconference terminal 3. The ROM 302 stores a control program such as an Initial Program Loader (IPL) used for operating the CPU 301. The RAM 303 is used as a work area for the CPU 301. The flash memory 304 stores various data such as a communication control program, image data, and audio data. The SSD 305 controls reading and/or writing of various data to and/or from the flash memory 304 under control of the CPU 301. In alternative to the SSD, a hard disk drive (HDD) may be used. The medium I/F 307 reads and/or writes (storing) data from and/or to a recording medium 306 such as a flash memory. The operation key 308 is operated according to a user input indicating an instruction in selecting a destination of a communication from the videoconference terminal 3, for example. The power switch 309 is a switch that turns on or off the power of the videoconference terminal 3.

The network I/F 311 enables the videoconference terminal 3 to establish a data communication with an external device via the communication network 100 such as the Internet. The camera 312 is an example of a built-in imaging device capable of capturing a subject under control of the CPU 301 to obtain image data. The imaging element I/F 313 is a circuit that controls driving of the camera 312. The microphone 314 is an example of a built-in sound collecting device capable of inputting sounds. The audio input/output interface 316 is a circuit for controlling input and output of audio signals between the microphone 314 and the speaker 315 under control of the CPU 301. The display I/F 317 is a circuit for transmitting image data to an external display 4 under control of the CPU 301. The external device connection I/F 318 is an interface circuit that connects the videoconference terminal 3 to various external devices. The near-distance communication circuit 319 is a communication circuit that establishes a communication in compliance with the NFC (registered trademark), the Bluetooth (registered trademark) and the like.

The bus line 310, which includes an address bus and a data bus, electrically connects to various elements, including the CPU 301 illustrated in FIG. 11, one other.

The display 4 is an example of a display unit, such as a liquid crystal or organic electroluminescence (EL) display that displays an image of subject, an operation icon, and the like. The display 4 is connected to the display I/F 317 by a cable 4c. The cable 4c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video image) of subject to electronic data by photoelectric conversion. Examples of the solid-state imaging element to be used include a CMOS sensor and a CCD sensor. The external device connection I/F 318 is connectable with an external device such as an external camera, an external microphone, and/or an external speaker through a USB cable, for example. When an external camera is connected, the external camera is driven in preference to the built-in camera 312 under control of the CPU 301. Similarly, when an external microphone is connected and/or an external speaker are/is connected, the external microphone and/or the external speaker are/is driven in preference to the built-in microphone 314 and/or the built-in speaker 315 under control of the CPU 301.

The recording medium 306 is removable from the videoconference terminal 3. The flash memory 304 is replaceable with any suitable memory, such as an electrically erasable and programmable ROM (EEPROM), as long as the memory is a non-volatile memory that reads or writes data under control of CPU 301.

<Hardware Configuration of Communication Management System 5 and PC 7>

Figure 12:
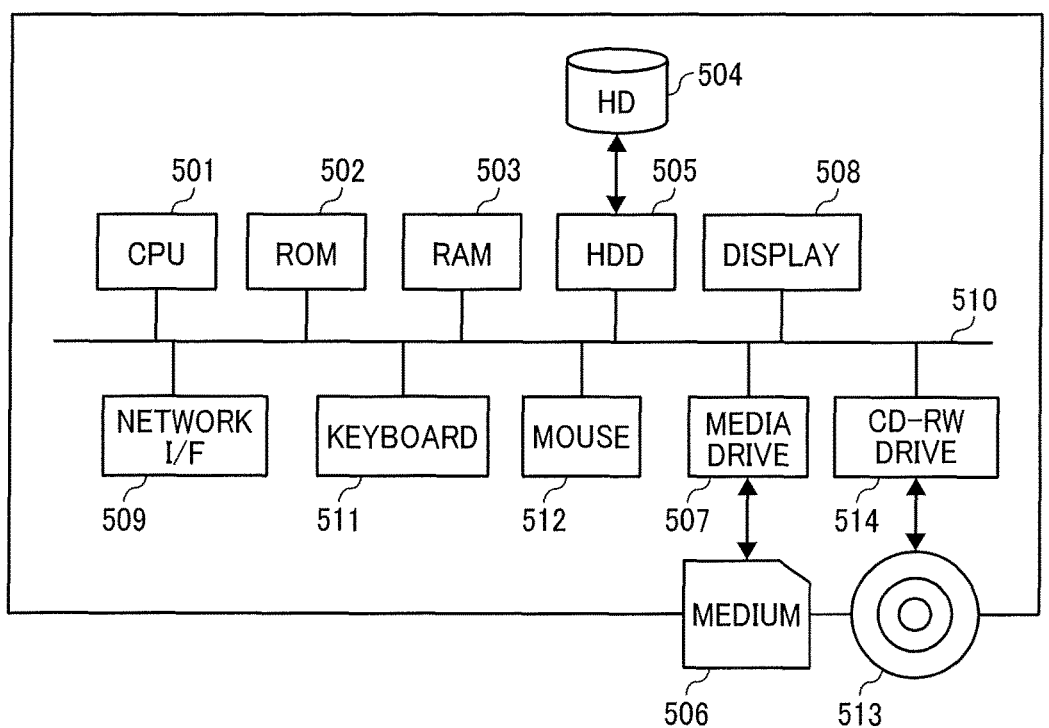
FIG. 12 is a block diagram illustrating a hardware configuration of any one of a communication management system and a personal computer (PC) 7 according to the one of the embodiments.

Hereinafter, a description is given of a hardware configuration of each of the communication management system 5 and the PC 7 according to the present embodiment with reference to FIG. 12. FIG. 12 is a block diagram illustrating an example of the hardware configuration of any one of the communication management system 5 and the PC 7. In the present embodiment, both the communication management system 5 and the PC 7 are individually implemented by a computer having the same hardware configuration. In the following, the communication management system 5 is used to describe the hardware configuration and the redundant description of the hardware configuration of the PC 7 is omitted here.

The communication management system 5 includes a CPU 501, a ROM 502, a RAM 503, a hard disk (HD) 504, a hard disc drive (HDD) 505, a media drive 507, a display 508, a network I/F 509, a keyboard 511, a mouse 512, a compact-disc rewritable (CD-RW) drive 514, and a bus line 510. The CPU 501 controls the entire operation of the communication management system 5. The ROM 502 stores programs such as an IPL to boot the CPU 501. The RAM 503 is used as a work area for the CPU 501. The HD 504 stores various data such as programs for the communication management system 5. The HDD 505 controls reading and writing of data from and to the HD 504 under control of the CPU 501. The media drive 507 controls reading and/or writing (storing) of data from and/or to a recording medium 506 such as a flash memory. The display 508 displays various information such as a cursor, menus, windows, characters, and images. The network I/F 509 enables the communication management system to establish a communication with an external device via the communication network 100. The keyboard 511 includes a plurality of keys to allow a user to input characters, numbers, and various instructions. The mouse 512 allows a user to input an instruction for selecting and executing various functions, selecting an item to be processed, or moving the cursor. The CD-RW drive 514 controls reading of data from a CD-RW 513, which is an example of a removable recording medium. The bus line 510 electrically connects those parts or devices of the communication management system 5 to one other as illustrated in FIG. 12. Examples of the bus line 510 include an address bus and a data bus.

<Hardware Configuration of Smartphone>

Figure 13:
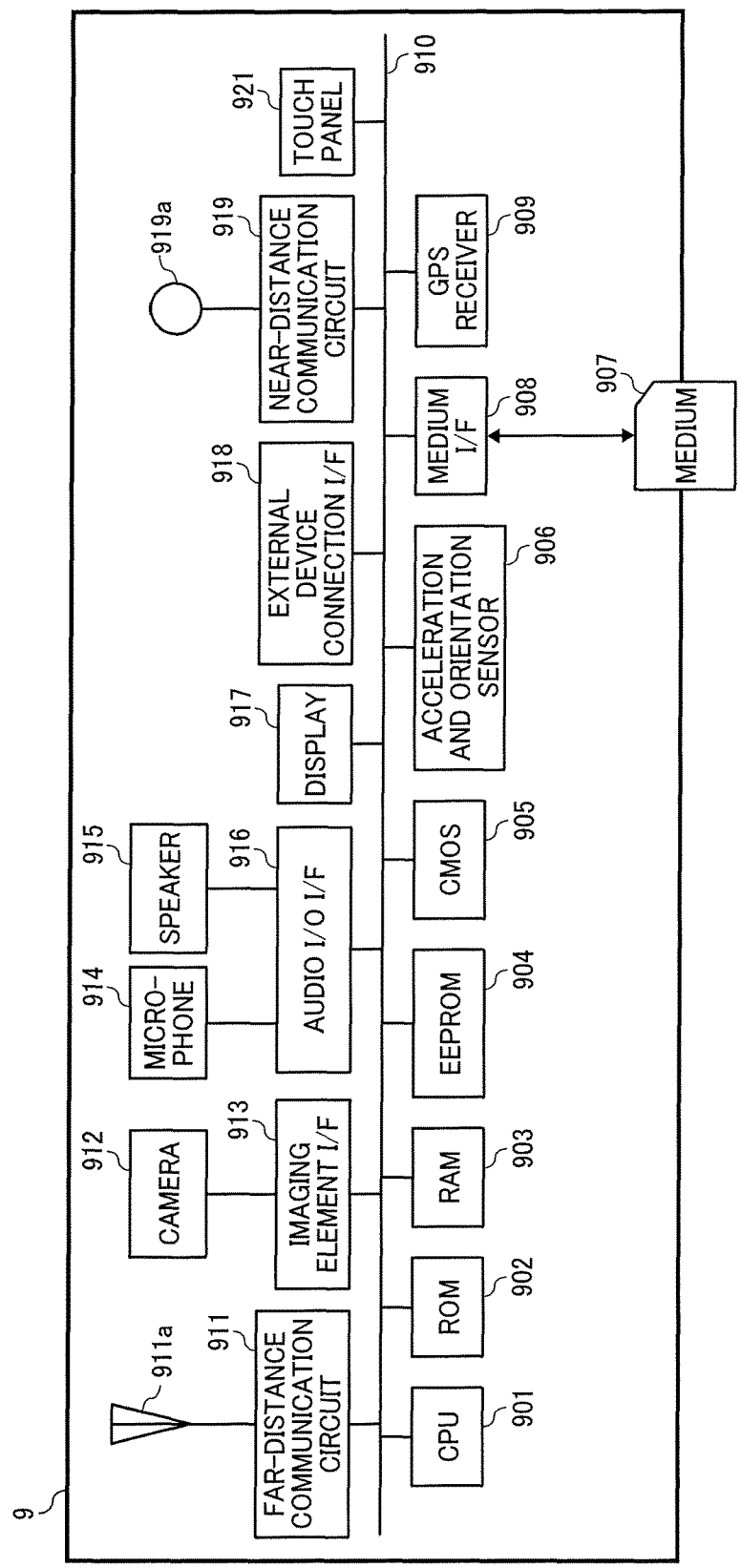
FIG. 13 is a diagram illustrating a hardware configuration of a smartphone according to the one of the embodiments.

Hereinafter, a description is given of a hardware configuration of the smartphone 9 according to the present embodiment with reference to FIG. 13. FIG. 13 is a diagram illustrating an example of the hardware configuration of the smartphone 9. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls the entire operation of the smartphone 9. The ROM 902 stores a program, such as an IPL, used for controlling the CPU 901. The RAM 903 is used as a work area for the CPU 901. The EEPROM 904 reads and/or writes various data such as a control program for the smartphone 9 under control of the CPU 901. The CMOS sensor 905 captures a subject (mainly, a self-image of a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading and/or writing data from and/or to a recording medium 907, such as a flash memory. The GPS receiver 909 receives a GPS signal from a GPS satellite.

The smartphone 9 further includes a far-distance communication circuit 911, a camera 912, an imaging element I/F 913, a microphone 914, a speaker 915, an audio input/output interface 916, a display 917, an external device connection I/F 918, a near-distance communication circuit 919, an antenna 919a for the near-distance communication circuit 919, and a touch panel 921.

The far-distance communication circuit 911 is a circuit that enables the smartphone to establish a communication with other device via the communication network 100. The camera 912 is an example of a built-in imaging device capable of capturing a subject under control of the CPU 901 to obtain image data. The imaging element I/F 913 is a circuit that controls driving of the camera 912. The microphone 914 is an example of a built-in sound collecting device capable of inputting sounds. The audio input/output interface 916 is a circuit for controlling input and output of audio signals between the microphone 914 and the speaker 915 under control of the CPU 901. The display 917 is an example of a display unit, such as a liquid crystal or organic electroluminescence (EL) display that displays an image of subject, and/or an operation icon, for example. The external device connection I/F 918 is an interface circuit that connects the smartphone 9 to various external devices. The near-distance communication circuit 919 is a communication circuit that establishes a communication in compliance with the NFC, the Bluetooth and the like. The touch panel 921 is an example of an input device to operate the smartphone 9 according to user operation of touching a surface of the display 917.

The smartphone 9 further includes a bus line 910. Examples of the bus line 910 include an address bus and a data bus, which electrically connects the elements including the CPU 901, one another.

It should be noted that a recording medium such as a compact disk read only memory (CD-ROM) or a hard disk storing any one of the above-described programs may be distributed domestically or overseas as a program product.

<<Functional Configuration of Example Embodiment>>

Figure 14:
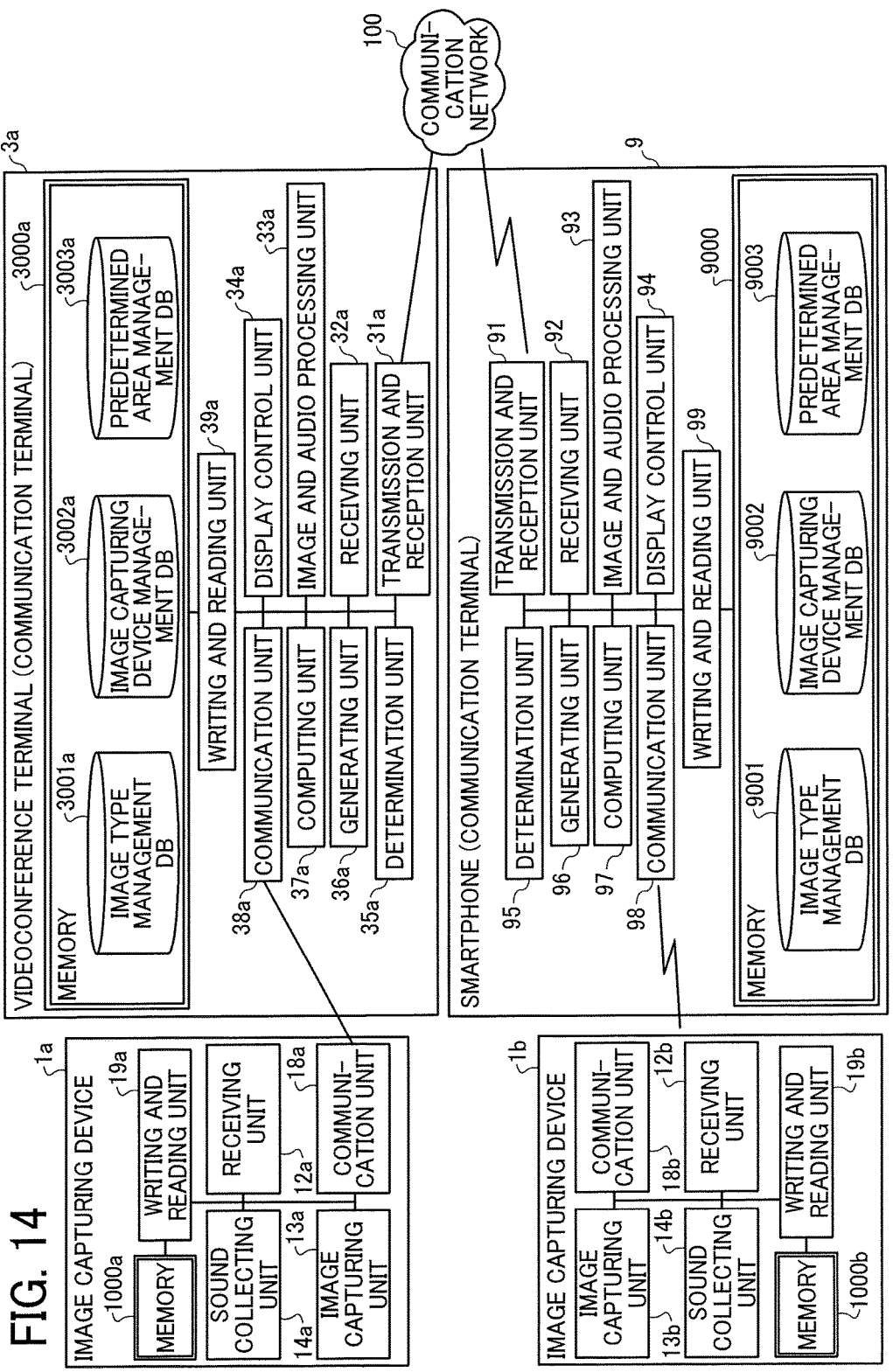
FIG. 14 is a schematic block diagram illustrating a part of a functional configuration of the image communication system according to the one of the embodiments.
Figure 15:
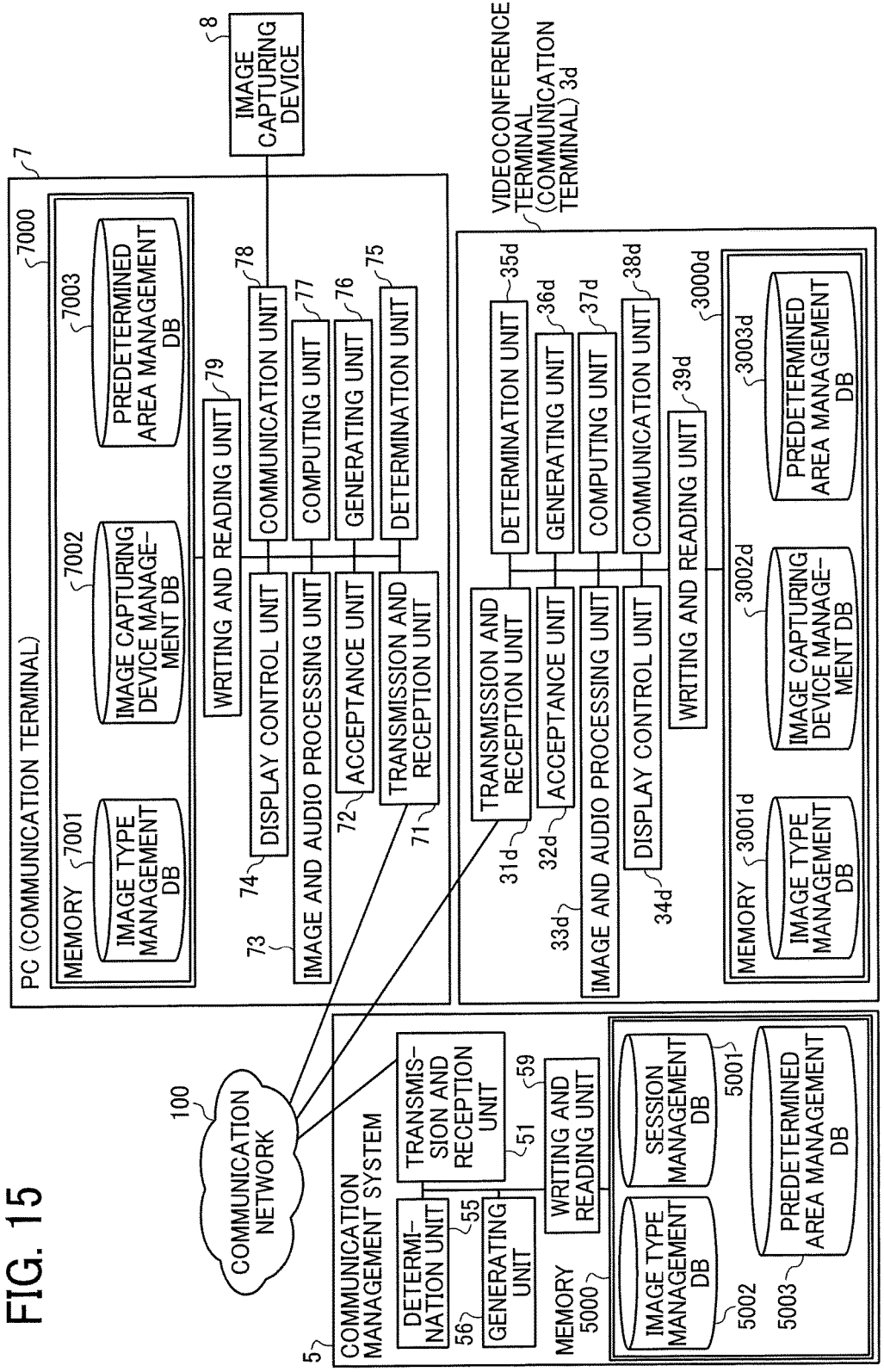
FIG. 15 is a schematic block diagram illustrating another part of the functional configuration of the image communication system according to the one of the embodiments.

Hereinafter, a description is given of a functional configuration of the image communication system according to the present embodiment with reference to FIG. 14 to FIG. 20. FIG. 14 and FIG. 15 are block diagrams, each illustrating a part of a functional configuration of the image communication system according to the present embodiment.

<Functional Configuration of Image Capturing Device 1a>

As illustrated in FIG. 14, the image capturing device 1a includes a receiving unit 12a, an image capturing unit 13a, a sound collecting unit 14a, a communication unit 18a, and a writing and reading unit 19a. Each of the above-mentioned units is a function or means that is implemented by operating any one or more of the elements illustrated in FIG. 10 according to instructions from the CPU 111 executing a control program for an image capturing device, which is expanded from the SRAM 113 to the DRAM 114.

The image capturing device 1a further includes a memory 1000a, which is implemented by the ROM 112, the SRAM 113, and/or the DRAM 114 illustrated in FIG. 10. The memory 1000a stores therein a globally unique identifier (GUID) identifying the own device (i.e., the image capturing device 1a).

The image capturing device 1b includes a receiving unit 12b, an image capturing unit 13b, a sound collecting unit 14b, a communication unit 18b, a writing and reading unit 19b, and a memory 1000b. Each of the above-mentioned functional units of the image capturing device 1b implements substantially the same function as corresponding one of the receiving unit 12a, the image capturing unit 13a, the sound collecting unit 14a, the communication unit 18a, the writing and reading unit 19a, and the memory 1000 of the image capturing device 1a, and the redundant description is omitted here.

(Functional Units of Image Capturing Device 1a)

A detailed description is given below of each functional unit of the image capturing device 1a according to the present embodiment with reference to FIG. 10 and FIG. 14.

The receiving unit 12a of the image capturing device 1a is mainly implemented by operation of the operation device 115 illustrated in FIG. 10 under control of the CPU 111 illustrated in FIG. 10. The receiving unit 12a receives an input according to a user operation.

The image capturing unit 13a is mainly implemented by operation of the imaging unit 101, the image processor 104, and the image controller 105 illustrated in FIG. 10 under control of the CPU 111 illustrated in FIG. 10. The image capturing unit 13a captures an image of subject or surroundings to obtain captured image data.

The sound collecting unit 14a is implemented by operation of the microphone 108 and the audio processor 109 illustrated in FIG. 10 under control of the CPU 111 illustrated in FIG. 10. The sound collecting unit 14a collects sounds around the image capturing device 1a.

The communication unit 18a is mainly implemented by operation of the CPU 111, and communicates with a communication unit 38a of the videoconference terminal 3a using a near-distance wireless communication technology in compliance with such as NFC, Bluetooth, or Wi-Fi.

The writing and reading unit 19a is mainly implemented by operation of the CPU 111 illustrated in FIG. 10 and stores data or information in the memory 1000a and/or reads data or information from the memory 1000a.

<Functional Configuration of Videoconference Terminal 3a,>

As illustrated in FIG. 14, the videoconference terminal 3a includes a transmission and reception unit 31a, a receiving unit 32a, an image and audio processing unit 33a, a display control unit 34a, a determination unit 35a, a generating unit 36a, a computing unit 37a, communication unit 38a, and a writing and reading unit 39a. Each of the above-mentioned units is a function or means that is implemented by operating any one or more of the elements illustrated in FIG. 11 according to instructions from the CPU 301 executing a control program for the videoconference terminal 3a, which is expanded from the flash memory 304 to the RAM 303.

The videoconference terminal 3a further includes a memory 3000a that is implemented by the ROM 302, the RAM 303, and the flash memory 304 illustrated in FIG. 11. The memory 3000a includes an image type management database (DB) 3001a, an image capturing device management DB 3002a, and a predetermined area management DB 3003a. The image type management DB 3001a is configured as an image type management table as illustrated in FIG. 16. The image capturing device management DB 3002a is configured as an image capturing device management table as illustrated in FIG. 17. The predetermined area management DB 3003a is configured as a predetermined area management table as illustrated in FIG. 18.

The videoconference terminal 3d includes a transmission and reception unit 31d, a receiving unit 32d, an image and audio processing unit 33d, a display control unit 34d, a determination unit 35d, a generating unit 36d, a computing unit 37d, communication unit 38d, a writing and reading unit 39d, and a memory 3000d. Each of the above-mentioned functional units of the videoconference terminal 3d implements substantially the same function as corresponding one of the transmission and reception unit 31a, the receiving unit 32a, the image and audio processing unit 33a, the display control unit 34a, the determination unit 35a, the generating unit 36a, the computing unit 37a, the communication unit 38a, the writing and reading unit 39a, and the memory 3000a of the videoconference terminal 3a, and the redundant description is omitted here. Additionally, the memory 3000d of the videoconference terminal 3d includes an image type management DB 3001d, and an image capturing device management DB 3002d, and a predetermined area management DB 3003d. Each of the above-mentioned DBs of the videoconference terminal 3d has substantially the same configuration as corresponding one of the image type management DB 3001a, the image capturing device management DB 3002a, and the predetermined area management DB 3003a of the videoconference terminal 3a, and the redundant description is omitted here.

(Image Type Management Table)

FIG. 16 is a conceptual diagram illustrating the image type management table according to the present embodiment. The image type management table stores an image data identifier (ID), an internet protocol (IP) address, which is an example of an address of a transmission source terminal, and a source name, in association with one another. The image data ID is one example of image data identification information that identifies image data to be used in a video communication (video call). The same identical image data ID is assigned to image data transmitted from the same transmission source terminal. By the image data ID, a transmission destination terminal (namely, a communication terminal that receives the image data) identifies the transmission source terminal of the received image data. The IP address of the transmission source terminal indicates an IP address of a communication terminal that transmits image data identified by an associated image data ID. The source name is a name for specifying an image capturing device that outputs image data identified by an associated image data ID. The source name is one example of the image type information. The source name is generated by each communication terminal such as the videoconference terminal 3a according to a naming rule.

The example of the image type management table illustrated in FIG. 16 indicates that four communication terminals, whose IP addresses are "1.2.1.3", "1.2.2.3", "1.3.1.3", and "1.3.2.3", transmit image data identified by the image data ID "RS001", "RS002", "RS003", and "RS004", respectively. Further, according to the image type management table illustrated in FIG. 16, the image types represented by the source names of those four communication terminals are "Video_Theta", "Video_Theta", "Video", and "Video" that indicate the image types, "special image", "special image", "general image", and "general image", respectively. In the present embodiment, "special image" is a spherical image.

In addition, data other than the image data may be stored in the image type management table in association with the image data ID. Examples of the data other than the image data include audio data and presentation material data to be shared on a screen.

(Image Capturing Device Management Table)

FIG. 17 is a conceptual diagram illustrating the image capturing device management table according to the present embodiment. The image capturing device management table stores a vendor ID and a product ID among the GUIDs of an image capturing device, which can obtain two hemispherical images, from which a spherical image is generated. As the GUID, a combination of a vendor ID (VID) and a product ID (PID) used in a USB device is used, for example. The vendor ID and the product ID are stored in a communication terminal such as a videoconference terminal before shipment or additionally stored in the videoconference terminal after shipment.

(Predetermined Area Management Table)

FIG. 18 is a conceptual diagram illustrating the predetermined area management table according to the present embodiment. The predetermined area management table stores an IP address of a transmission source terminal of captured image data representing a captured image, an IP address of a transmission destination terminal of the captured image data, and predetermined area information indicating a predetermined area image being displayed by the transmission destination terminal, in association with one another. The transmission destination terminal of the captured image data is identical with the transmission source terminal of the predetermined area information. The predetermined area information is a conversion parameter used to convert from a captured image to an image of a predetermined area T of the captured image (predetermined area image), as illustrated in FIG. 6A, FIG. 6B, and FIG. 7. The IP address is used as one example of destination information. Other examples of the destination information include a media access control (MAC) address and a terminal ID, which identifies a corresponding communication terminal. In the description of the present embodiment, an IPv4 address is simplified to represent the IP address. The IP address may be IPv6.

In the example of FIG. 18, in the first line to the third line of the table, cases where the videoconference terminal 3a having an IP address of "1.2.1.3", transmits captured image data, via the communication management system 5, to the videoconference terminal 3d having an IP address of "1.2.2.3", the PC 7 having an IP address of "1.3.1.3", and the smartphone 9 having an IP address of "1.3.2.3" are managed. Further, the predetermined area management table illustrated in FIG. 18 indicates that the videoconference terminal 3d is a communication terminal that is also a transmission source of the predetermined area information ($r=10$, $\theta=20$, $\varphi=30$). Similarly, the PC 7 is a communication terminal that is a transmission source of the predetermined area information ($r=20$, $\theta=30$, $\varphi=40$). Similarly, the smartphone 9 is a communication terminal that is a transmission source of the predetermined area information ($r=30$, $\theta=40$, $\varphi=50$).

When the transmission and reception unit 31a newly receives predetermined area information including the same set of IP addresses of the communication terminal of transmission source and the communication terminal of transmission destination that is already managed in the table, the writing and reading unit 39a overwrites the currently managed predetermined area information with the newly received predetermined area information.

(Functional Units of Videoconference Terminal 3a)

Hereinafter, a detailed description is given of the functional units of the videoconference terminal 3a according to the present embodiment with reference to FIG. 11 and FIG. 14.

The transmission and reception unit 31a of the videoconference terminal 3a is mainly implemented by operation of the network I/F 311 illustrated in FIG. 11 under control of the CPU 301 illustrated in FIG. 11. The transmission and reception unit 31a transmits and/or receives data or information to and/or from the communication management system 5 via the communication network 100.

The receiving unit 32a is mainly implemented by operation of the operation key 308 under control of the CPU 301. The receiving unit 32a receives selections or inputs according to a user operation. Additionally, an input device such as a touch panel may be used as an alternative to or in place of the operation key 308.

The image and audio processing unit 33a is implemented by instructions from the CPU 301 illustrated in FIG. 11, and processes image data obtained by capturing a subject by the camera 312. After voice sounds generated by a user is converted into audio signals by the microphone 314, the image and audio processing unit 33a performs processing on audio data associated with the audio signals.

Further, the image and audio processing unit 33a processes image data received from another communication terminal based on the image type information such as a source name, to enable the display control unit 34a to cause the display 4 to display an image based on the processed image data. More specifically, when the image type information indicates "special image", the image and audio processing unit 33a converts the image data such as hemispherical image data as illustrated in FIG. 3A and FIG. 3B into spherical image data to generate the spherical image data as illustrated in FIG. 4B, and further generates a predetermined area image as illustrated in FIG. 6B. Furthermore, the image and audio processing unit 33a outputs, to the speaker 315, audio signals associated with audio data received from another communication terminal via the communication management system 5 to cause the speaker 315 to output voice sounds based on the audio signal.

The display control unit 34a is mainly implemented by operation of the display I/F 317 and the CPU 301. The display control unit 34a causes the display 4 to display various images and/or characters.

The determination unit 35a is implemented by instructions from the CPU 301 and determines an image type associated with image data received from, for example, the image capturing device 1a.

The generating unit 36a is mainly implemented by operation of the CPU 301 and generates a source name, which is one example of the image type information, according to the naming rule, based on a determination result, which indicates one of "general image" and "special image" ("special image" is a spherical image in the present embodiment), obtained by the determination unit 35a. For example, when the determination unit 35a determines that an image type is "general image", the generating unit 36a generates a source name of "Video" that indicates a "general image" type. On the other hand, when the determination unit 35a determines that an image type is "special image", the generating unit 36a generates a source name of "Video_Theta" that indicates a "special image" type.

The computing unit 37a is mainly implemented by operation of the CPU 301, and computes orientation of a predetermined area T1 in relation to a predetermined area T2 in the captured image based on predetermined area information (i2) that is information on the predetermined area T2 and predetermined area information (i1) that is information on the predetermined area T1. The predetermined area information (i1) is received from another communication terminal by the transmission and reception unit 31a. The predetermined information (i1) indicates the predetermined area T1 in the captured image. In the description of the present embodiment, an image to be displayed corresponding to the whole captured image may be referred to as a "whole image".

The communication unit 38a is mainly implemented by operation of the near-distance communication circuit 319 and the antenna 319a under control of the CPU 301. The communication unit 38a communicates with the communication unit 18a of the image capturing device 1a using the near-distance communication technology in compliance with such as NFC, Bluetooth, or Wi-Fi. Although, in the description of the present embodiment, the communication unit 38a and the transmission and reception unit 31a individually have a communication unit, however the disclosure is not limited to this and the communication unit 38a and the transmission and reception unit 31a may configured as a single communication unit together.

The writing and reading unit 39a is mainly implemented by instructions from the CPU 301 illustrated in FIG. 11 and stores data or information in the memory 3000 and/or reads data or information from the memory 3000.

<Functional Configuration of Communication Management System 5>

Hereinafter, a detailed description is given of each functional unit of the communication management system 5 according to the present embodiment with reference to FIG. 12 and FIG. 15. The communication management system 5 includes a transmission and reception unit 51, a determination unit 55, a generating unit 56, and a writing and reading unit 59. Each of the above-mentioned units is a function or means that is implemented by operating any one or more of the elements illustrated in FIG. 12 according to instructions from the CPU 501 executing a control program for the communication management system 5, which is expanded from the HD 504 to the RAM 503.

The communication management system 5 further includes a memory 5000 that is implemented by the RAM 503 and the HD 504 illustrated in FIG. 12. The memory 5000 includes a session management DB 5001, an image type management DB 5002, and a predetermined area management DB 5003. The session management DB 5001 is configured as a session management table as illustrated in FIG. 19. The image type management DB 5002 is configured as an image type management table as illustrated in FIG. 20. The predetermined area management DB 5003 is configured as an image type management table as illustrated in FIG. 21.

(Session Management Table)

FIG. 19 is a conceptual diagram illustrating the session management table according to the present embodiment. The session management table stores a session ID and an IP address of a participant communication terminal, in association with one other. The session ID is one example of session identification information (identifier) that identifies a session implementing a video call. Each session ID is generated for a corresponding virtual conference room. The one or more session IDs are also stored and managed in each communication terminal, such as the videoconference terminal 3a, to be used by each communication terminal to select a communication session. The IP address of the participant communication terminal indicates an IP address of a communication terminal that participates in a virtual conference room identified by an associated session ID.

(Image Type Management Table)

FIG. 20 is a conceptual diagram illustrating the image type management table according to the present embodiment. The image type management table illustrated in FIG. 20 stores, in addition to the information items stored in the image type management table illustrated in FIG. 16, the same session IDs as those stored in the session management table, in association with one another. In the example of the image type management table illustrated in FIG. 20, three communication terminals whose IP addresses are "1.2.1.3", "1.2.2.3", and "1.3.1.3" are participating in the virtual conference room identified by the session ID of "se101". The communication management system 5 stores the image data ID, the IP address of the transmission source terminal, and the image type information same as those stored in the communication terminal, such as the videoconference terminal 3a, so that the communication management system 5 can transmit the image type information, etc. to a communication terminal that is currently participating in a video communication and another communication terminal that newly participates in the video communication by entering a virtual conference room of the video communication. Accordingly, the communication terminal that is already in the video communication and the communication terminal that is newly participates in the video communication do not have to exchange such information including the image type information.

(Predetermined Area Management Table)

FIG. 21 is a conceptual diagram illustrating the predetermined area management table according to the present embodiment. The predetermined area management illustrated in FIG. 21 has substantially the same data structure as the predetermined area management table illustrated in FIG. 18. As described later, the transmission and reception unit 51 transmits, to each communication terminal, the latest predetermined area information, periodically, for example, for each thirty-second. Accordingly, all the predetermined area information received by the transmission and reception unit 51 during a period from when the predetermined area information is transmitted the last time to when the latest predetermined area information is transmitted, is saved without being delated. In the example of FIG. 21, the newer the predetermined area information is, the higher a level of management becomes in the predetermined area management table.

(Functional Units of Communication Management System 5)

Hereinafter, a detailed description is given of each functional unit of the communication management system 5 according to the present embodiment with reference to FIG. 12 and FIG. 15.

The transmission and reception unit 51 of the communication management system 5 is mainly implemented by operation of the network I/F 509 illustrated in FIG. 12 under control of the CPU 501 illustrated in FIG. 12. The transmission and reception unit 51 transmits and/or receives data or information to and/or from the videoconference terminal 3a, the videoconference terminal 3d, and/or the PC 7 via the communication network 100.

The determination unit 55, which is mainly implemented by operation of the CPU 501, and performs various determinations.

The generating unit 56 is mainly implemented by operation of the CPU 501 and generates an image data ID.

The data writing and reading unit 59 is mainly implemented by operation of the HDD 505 illustrated in FIG. 12 under control of the CPU 501 illustrated in FIG. 12. The writing and reading unit 59 stores data or information in the memory 5000 and/or reads data or information from the memory 5000.

<Functional Configuration of PC>

Hereinafter, a detailed description is given of a functional configuration of the PC 7 according to the present embodiment with reference to FIG. 12 and FIG. 14. The PC 7 has substantially the same functions as the videoconference terminal 3a. Namely, as illustrated in FIG. 14, the PC 7 includes a transmission and reception unit 71, a receiving unit 72, an image and audio processing unit 73, a display control unit 74, a determination unit 75, a generating unit 76, a computing unit 77, a communication unit 78, and a writing and reading unit 79. Each of the above-mentioned units is a function or means that is implemented by operating any one or more of the elements illustrated in FIG. 12 according to instructions from the CPU 501 executing a control program for the PC 7, which is expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, and a predetermined area management DB 7003. The image type management DB 7001, the image capturing device management DB 7002, and the predetermined area management DB 7003 have substantially the same configuration as the image type management DB 3001a, the image capturing device management DB 3002a, and the predetermined area management DB 3003a, respectively, and the redundant description is omitted here.

(Functional Units of PC 7)

The transmission and reception unit 71 of the PC 7 is mainly implemented by operation of the network I/F 509 illustrated in FIG. 12 under control of the CPU 501 illustrated in FIG. 12 and implements substantially the same function as the transmission and reception unit 31a.

The receiving unit 72 is mainly implemented by operation of the keyboard 511 and the mouse 512 under control of the CPU 501, and implements substantially the same function as the receiving unit 32a. The image and audio processing unit 73 is mainly implemented by instructions from the CPU 501 and implements substantially the same function as the image and audio processing unit 33a. The display control unit 74 is mainly implemented by operation of the CPU 501 and implements substantially the same function as the display control unit 34a. The determination unit 75 is mainly implemented by operation of the CPU 501 and implements substantially the same function as the determination unit 35a. The generating unit 76 is mainly implemented by operation of the CPU 501 and implements substantially the same function as the generating unit 36a. The computing unit 77 is mainly implemented by operation of the CPU 501 and implements substantially the same function as the generating unit 37a. The communication unit 78 is mainly implemented by operation of the CPU 501 and implements substantially the same function as the communication unit 38a. The writing and reading unit 79 is implemented by operation of the CPU 501 and stores data or information in the memory 7000 and/or reads data or information from the memory 7000.

<Functional Configuration of Smartphone>

Hereinafter, a detailed description is given of a functional configuration of the smartphone 9 according to the present embodiment with reference to FIG. 13 and FIG. 14. The smartphone 9 has substantially the same functions as the videoconference terminal 3a. Namely, as illustrated in FIG. 14, the smartphone 9 includes a transmission and reception unit 91, a receiving unit 92, an image and audio processing unit 93, a display control unit 94, a determination unit 95, a generating unit 96, a computing unit 97, a communication unit 98, and a writing and reading unit 99. Each of the above-mentioned units is a function or means that is implemented by operating any one or more of the elements illustrated in FIG. 13 according to instructions from the CPU 901 executing a control program for the smartphone 9, which is expanded from the EEPROM 904 to the RAM 904.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, and a predetermined area management DB 9003. The image type management DB 9001, the image capturing device management DB 9002, and the predetermined area management DB 9003 have substantially the same configuration as the image type management DB 3001a, the image capturing device management DB 3002a, and the predetermined area management DB 3003a, respectively, and the redundant description is omitted here.

(Functional Units of Smartphone 9)

The transmission and reception unit 91 of the smartphone 9 is mainly implemented by operation of the far-distance communication circuit 911 illustrated in FIG. 13 under control of the CPU 901 illustrated in the FIG. 13 and implements substantially the same function as the transmission and reception unit 31a.

The receiving unit 92 is mainly implemented by the touch panel 921 under control of the CPU 901, and implements substantially the same function as the receiving unit 32a.

The image and audio processing unit 93 is mainly implemented by instructions from the CPU 901 and implements substantially the same function as the image and audio processing unit 33a. The display control unit 94, which is mainly implemented by operation of the CPU 901 and implements substantially the same function as the display control unit 34a. The determination unit 95 is mainly implemented by operation of the CPU 901 and implements substantially the same function as the determination unit 35a. The generating unit 96 is mainly implemented by operation of the CPU 901 and implements substantially the same function as the generating unit 36a. The computing unit 97 is mainly implemented by operation of the CPU 901 and implements substantially the same function as the generating unit 37a. The communication unit 98 is mainly implemented by operation of the CPU 901 and implements substantially the same function as the communication unit 38a. The writing and reading unit 99 is implemented by operation of the CPU 901 and stores data or information in the memory 9000 and/or reads data or information from the memory 9000.

<Operation or Process>

Hereinafter, a description is given of operation or process according to the present embodiment with reference to FIG. 22 to FIG. 32.

<Participation Process>

Figure 22:
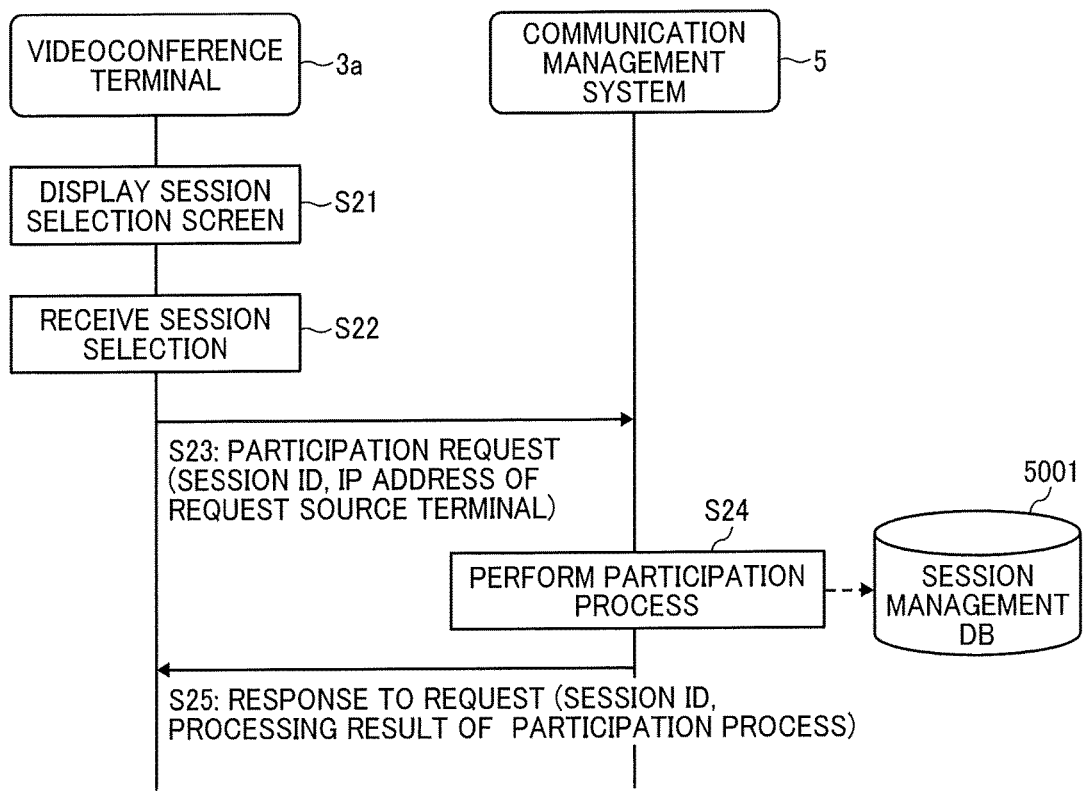
FIG. 22 is a sequence diagram illustrating a process of participating in a specific communication session, according to the one of the embodiments.
Figure 23:
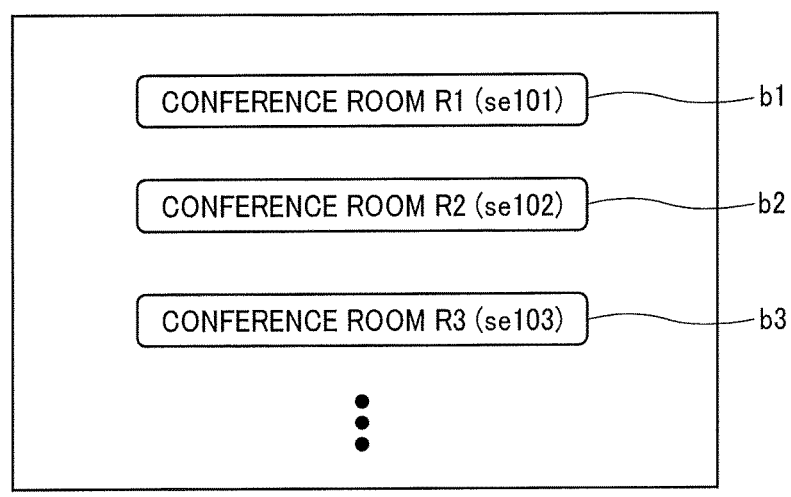
FIG. 23 is an illustration of a session selection screen for selecting a communication session (virtual conference room), according to the one of the embodiments.

A process of participating in a specific communication session is described with reference to FIG. 22 and FIG. 23. FIG. 22 is a sequence diagram illustrating the process of participating in a specific communication session according to the present embodiment. FIG. 23 is an illustration of a session selection screen for selecting a communication session (virtual conference room) according to the present embodiment.

When a user in the site A (e.g., user A1) operates the videoconference terminal 3a to display the session selection screen for selecting a communication session (virtual conference room), the receiving unit 32a receives the operation to display the session selection screen, and the display control unit 34a causes the display 4a to display the session selection screen as illustrated in FIG. 23 (S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the receiving unit 32a receives selection of a corresponding communication session (S22). Then, the transmission and reception unit 31a transmits a request to participate in the communication session, namely to enter the corresponding virtual conference room, to the communication management system 5 (S23). The request may be referred to as a participation request. The participation request includes a session ID identifying the communication session selected and received at S22, and the IP address of the videoconference terminal 3a, which is a request transmission source terminal. The transmission and reception unit 51 of the communication management system 5 receives the participation request.

Subsequently, the writing and reading unit 59 performs a process for enabling the videoconference terminal 3a to participate in the communication session (S24). More specifically, the writing and reading unit 59 adds, in the session management DB 5001 (see FIG. 19), the IP address received at S23 to a field of the participant terminal IP address in a record of the session ID that is the same as the session ID received at S23. The transmission and reception unit 51 transmits a response to the participation request to the videoconference terminal 3a (S25). The response to the participation request includes the session ID that is received at S23, and a result of the participation process. The transmission and reception unit 31a of the videoconference terminal 3a receives the response to the participation request. The following describes a case where the process for enabling the videoconference terminal 3a to participate in the communication session, namely participation process, is successfully completed.

<Process of Managing Image Type Information>

Figure 24:
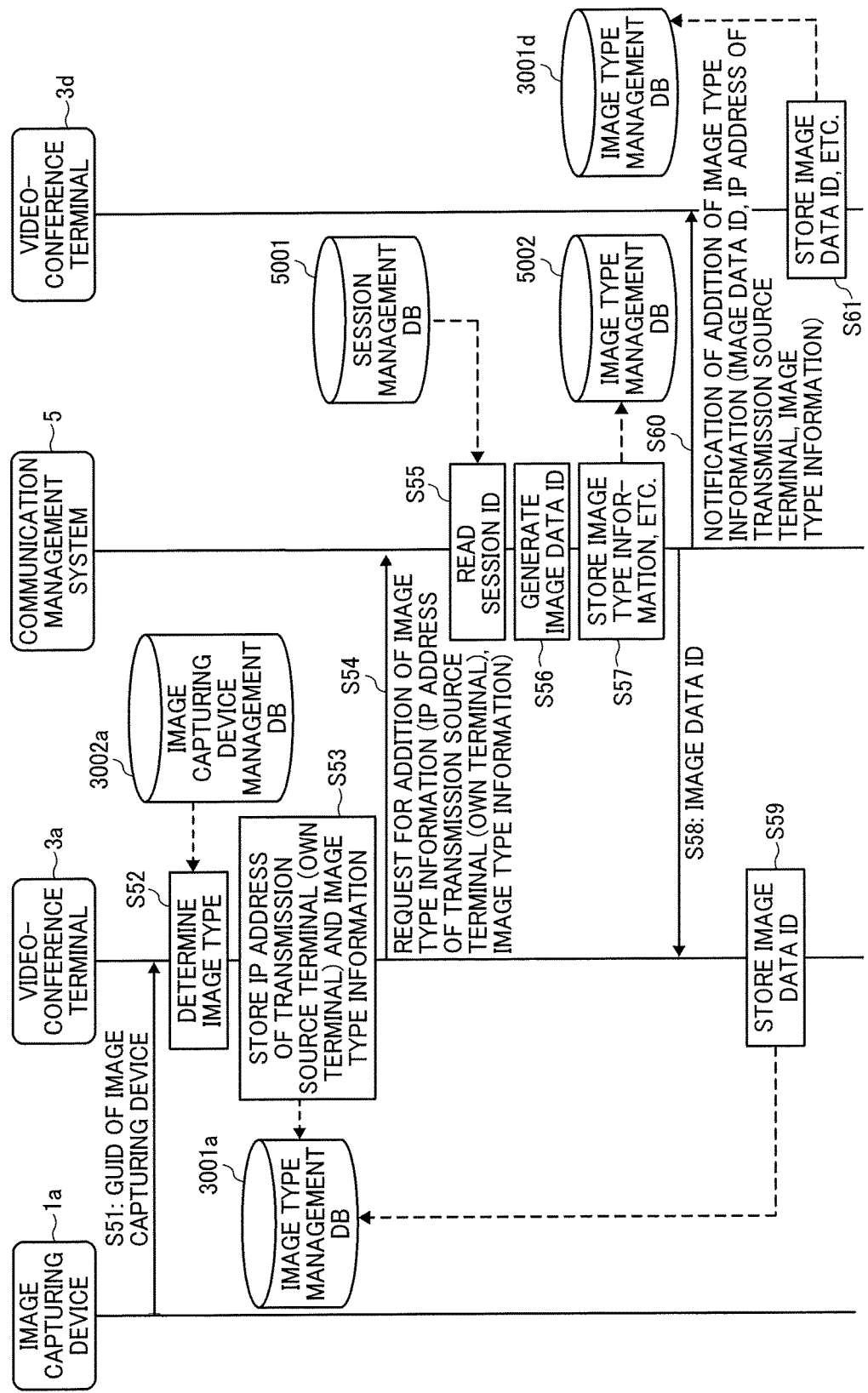
FIG. 24 is a sequence diagram illustrating a process of managing image type information, according to the one of the embodiments.

Hereinafter, a description is given of a process of managing the image type information according to the present embodiment with reference to FIG. 24. FIG. 24 is a sequence diagram illustrating the process of managing the image type information according to the present embodiment.

When a user in the site A (e.g., the user A1) connects the cradle 2a, on which the image capturing device 1a is mounted, to the videoconference terminal 3a, using the wired cable such as a USB cable, the writing and reading unit 19a of the image capturing device 1a reads the GUID of the own device (e.g., the image capturing device 1a) from the memory 1000a. Then, the communication unit 18a transmits the own device's GUID to the communication unit 38a of the videoconference terminal 3 (S51). The communication unit 38a of the videoconference terminal 3a receives the GUID of the image capturing device 1a.

Subsequently, the determination unit 35a of the videoconference terminal 3a determines whether a vendor ID and a product ID same as the GUID received at S51 are stored in the image capturing device management DB 3002a (see FIG. 17) to determine the image type (S52). More specifically, the determination unit 35a determines that the image capturing device 1a is an image capturing device that captures a special image (a spherical image in the present embodiment), when the same vender ID and product ID are stored in the image capturing device management DB 3002a. On the other hand, the determination unit 35a determines that the image capturing device 1a is an image capturing device that captures a general image, when the same vender ID and product ID are not stored in the image capturing device management DB 3002a.

Subsequently, the writing and reading unit 39a stores, in the image type management DB 3001a (see FIG. 16), the IP address of the own terminal (i.e., videoconference terminal 3a) that is a transmission source terminal, in association with the image type information that is a determination result determined at S52 (S53). In this state, any image data ID is not yet associated. Examples of the image type information include a source name, which is determined according to the naming rule, and an image type ("general image" or "special image").

Then, the transmission and reception unit 31a transmits a request for addition of the image type information to the communication management system 5 (S54). The request for addition of the image type information includes the IP address of the own terminal as a transmission source terminal, and the image type information, both being stored at S53 in association with one other. The transmission and reception unit 51 of the communication management system 5 receives the request for addition of the image type information.

Subsequently, the writing and reading unit 59 of the communication management system 5 refers to the session management DB 5001 (see FIG. 19) using the IP address of the transmission source terminal received at S54 as a search key, to search and read the session ID associated with the IP address (S55).

Subsequently, the generating unit 56 generates a unique image data ID (S56). Then, the writing and reading unit 59 stores, in the image type management DB 5002 (see FIG. 20), as a new record, the session ID that is read at S55, the image data ID generated at S56, the IP address of the transmission source terminal, and the image type information that are received at S54, in association with one another (S57). Then, the transmission and reception unit 51 transmits the image data ID newly generated at S56 to the videoconference terminal 3a. The transmission and reception unit 31 of the videoconference terminal 3a receives the image data ID (S58).

Next, the writing and reading unit 39a of the videoconference terminal 3a stores, in the image type management DB 3001a (see FIG. 16), the image data ID received at S58, in association with the IP address of the own terminal (i.e., videoconference terminal 3a) as the transmission source terminal and the image type information that are stored at S53 (S59).

Further, the transmission and reception unit 51 of the communication management system 5 transmits a notification of addition of the image type information to other communication terminal (videoconference terminal 3d in the present embodiment) (S60). This notification of addition of the image type information includes the image data ID generated at S56, and the IP address of the own terminal (i.e., videoconference terminal 3a) as the transmission source terminal and the image type information that are stored at S53. The transmission and reception unit 31d of the videoconference terminal 3d receives the notification of addition of the image type information. The destination of to the notification transmitted by the transmission and reception unit 51 is indicated by an IP address associated with the session ID with which the IP address of the videoconference terminal 3a is associated in the session management DB 5001 (see FIG. 19). Namely, the destination includes other communication terminal(s) that is (are) in the same virtual conference room where the videoconference terminal 3a is participating in.

Next, the writing and reading unit 39d of the videoconference terminal 3d stores, in the image type management DB 3001d (see FIG. 16), as a new record, the image data ID, the IP address of the sender terminal, and the image type information, which are received at S60 in association with one other (S61). In substantially the same manner, the notification of addition of the image type information is transmitted to the smartphone 9 and the PC 7, which are other communication terminals, and then the smartphone 9 and the PC 7 stores the image type information, etc. in the image type management DB 9001 and the image type management DB 7001, respectively. Through the process as described above, the same information is shared among the communication terminals by being stored in the image type management DBs 3001a, 3001d, 7001 and 9001.

<Process of Establishing Communication to Transmit and Receive Captured Image Data>

Figure 25A:
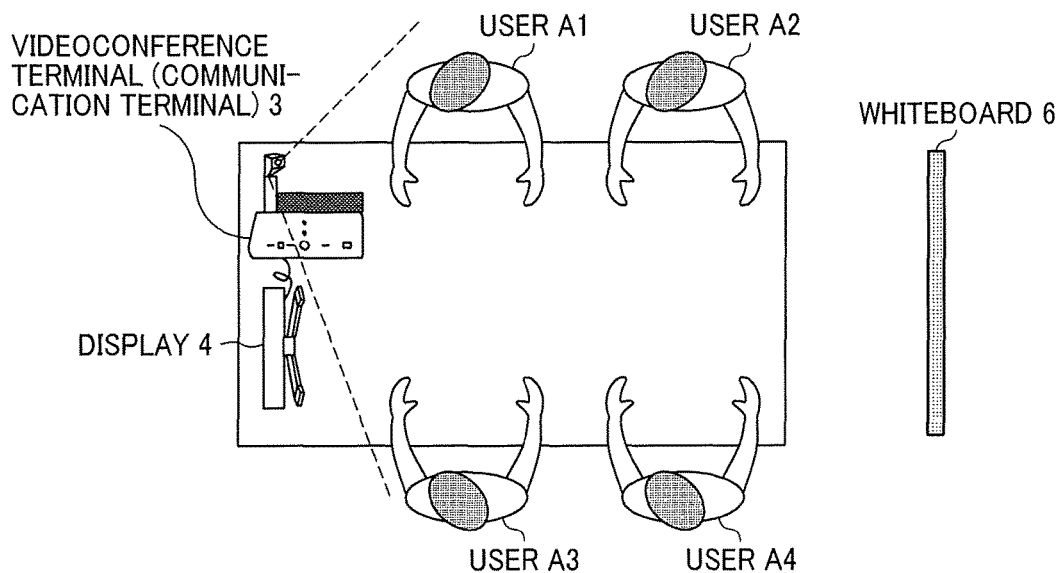
FIG. 25A is an illustration of a state in performing a video call without using the image capturing device, according to the one of the embodiments.
Figure 25B:
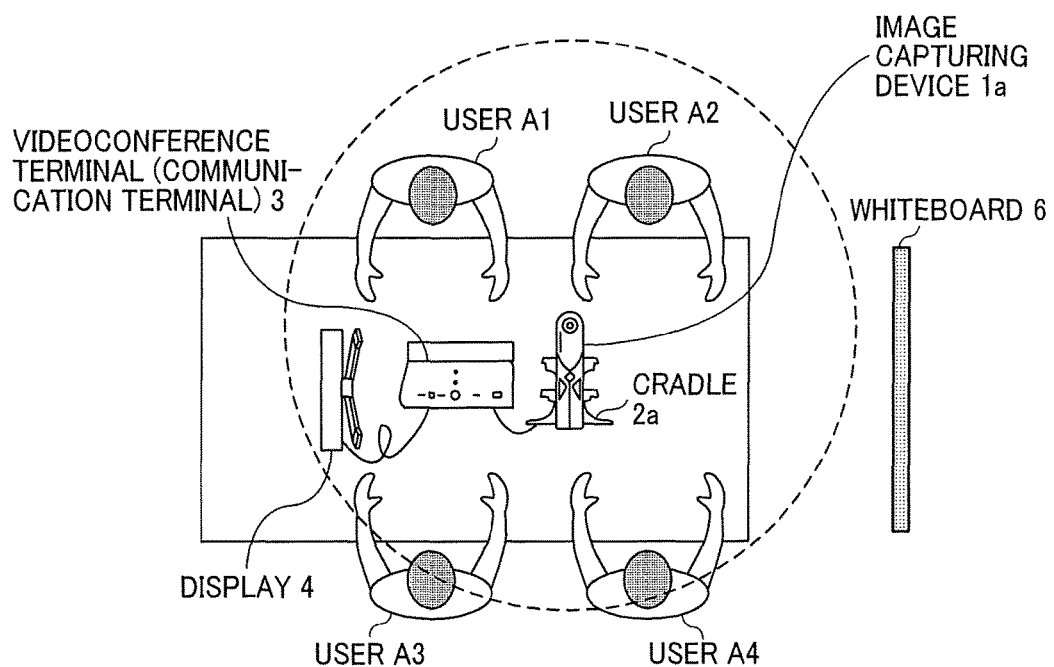
FIG. 25B is an illustration of another state in performing a video call using the image capturing device, according to the one of the embodiments.

Hereinafter, a description is given of a process of establishing a communication using captured image data in a video call according to the present embodiment with reference to FIG. 25A to FIG. 28. FIG. 25A and FIG. 25B are illustrations of states in performing a video call. In FIG. 25A, the image capturing device 1a is not used, while in FIG. 25B, the image capturing device 1a is used.

As illustrated in FIG. 25A, when the camera 312, which is built into the videoconference terminal 3a, is used and the image capturing device 1a is not used (see FIG. 11), the videoconference terminal 3a has to be placed in a corner of a table, so that images of the users A1 to A4 can be captured by the camera 312 having a field angle that is horizontally 125 degrees and vertically 70 degrees. This requires the users A1 to A4 to look in the direction of the videoconference terminal 3a while talking. Because the user A1 to A4 look in the direction of the videoconference terminal 3a, the display 4a is also to be placed near the videoconference terminal 3a. This requires the user A2 and the user A4, who are farer than the other user from the videoconference terminal 3a including the microphone 314 (see FIG. 11), to talk with a relatively large volume. Further, the user A2 and A4 may find difficulty to see contents displayed on the display 4a.

By contrast, when the image capturing device 1a, which can obtain two hemispherical images, from which a spherical image is generated, is used, the videoconference terminal 3a and the display 4a can be placed in the center of the table, as illustrated in FIG. 25B. Comparing with the case where the image capturing device 1a is not used as illustrated in FIG. 25A, the users A1 to A4 can talk with a relatively low volume, because the users A1 to A4 is closer to the microphone 314. Further, it gets easier for the users A1 to A4 to see contents displayed on the display 4a. In addition, a whiteboard 6 is provided in the right side of the site A, and the users A1 to A4 can use the whiteboard 6 by writing characters or drawing images.

Figure 26:
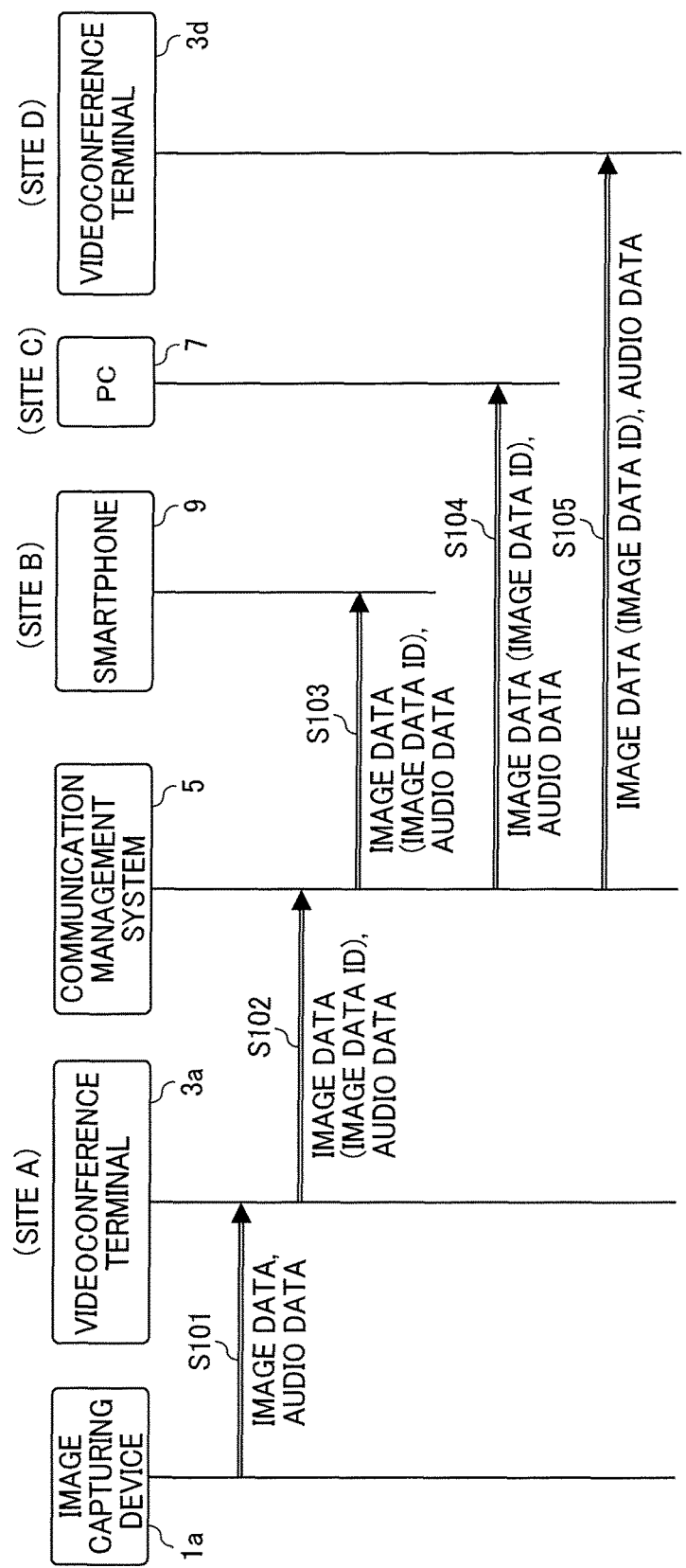
FIG. 26 is a sequence diagram illustrating a process of transmitting captured image data and audio data in a video call according to an embodiment of the disclosure, according to the one of the embodiments.

Hereinafter, a description is given of a process of transmitting captured image data and audio data obtained in the site A illustrated in FIG. 25B to other communication terminals (smartphone 9, PC 7, and videoconference terminal 3d) via the communication management system 5 according to the present embodiment with reference to FIG. 26. FIG. 26 is a sequence diagram illustrating the process of transmitting captured image data and audio data in a video call according to the present embodiment.

The communication unit 18a of the image capturing device 1a transmits captured image data obtained by capturing a subject or surrounding and audio data obtained by collecting sounds to the communication unit 38a of the videoconference terminal 3a (S101). Because the image capturing device 1a is a device that is capable of obtaining two hemispherical images, from which a spherical image is generated, the captured image data is configured by data of the two hemispherical images as illustrated in FIG. 3A and FIG. 3B. The communication unit 38a of the videoconference terminal 3a receives the captured image data and the audio data.

Subsequently, the transmission and reception unit 31a of the videoconference terminal 3a transmits, to the communication management system 5, the captured image data and the audio data received from the image capturing device 1a (S102). Along with the captured data and the audio data, an image data ID identifying the captured image data, which is a transmission target is also transmitted. Accordingly, the transmission and reception unit 51 of the communication management system 5 receives the image data and the image data ID.

Subsequently, the transmission and reception unit 51 of the communication management system 5 transmits the captured image data and the audio data to other participant communication terminal participating in the same video call in which the videoconference terminal 3a is participating, namely the smartphone 9, the PC 7, and the videoconference terminal 3d (S103, S104, S105). Along with the captured data and the audio data, the image data ID identifying the captured image data, which is a transmission target is also transmitted. Accordingly, each of the transmission and reception unit 91 of the smartphone 9, the transmission and reception unit 71 of the PC 7, and the transmission and reception unit 31d of the videoconference terminal 3d receives the image data, the image data ID, and the audio data.

Figure 27:
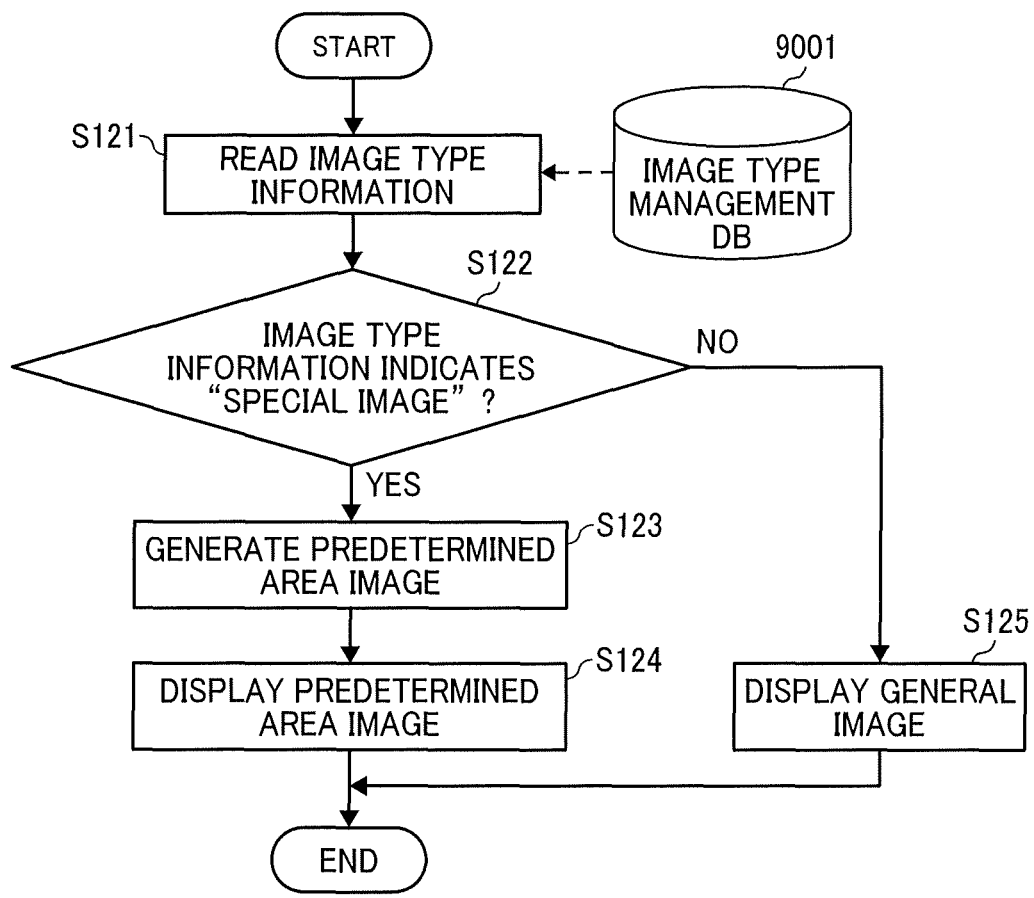
FIG. 27 is a flowchart illustrating a process of displaying a captured image, according to the one of the embodiments.
Figure 28:
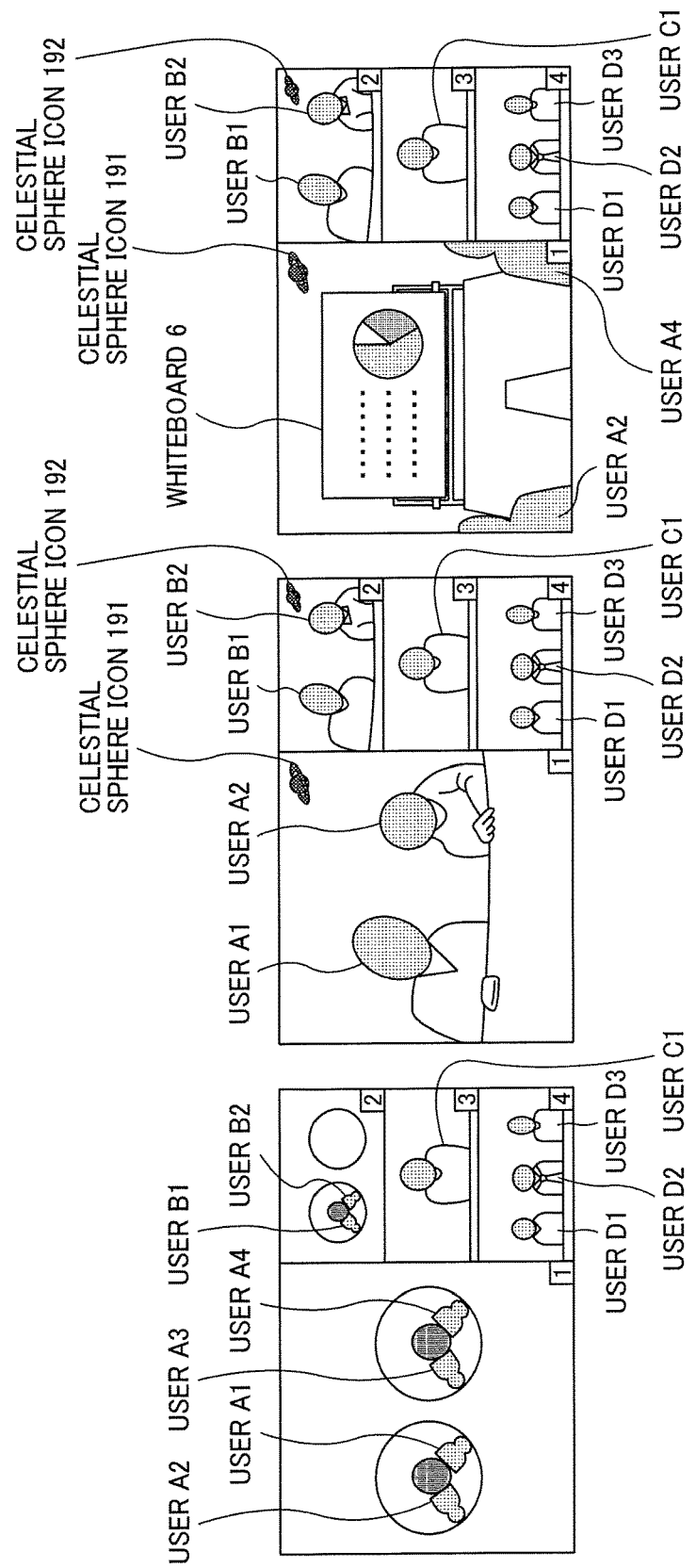
FIG. 28A is an illustration of a screen of a display in one site, in which the display displays images corresponding to captured image data transmitted via the videoconference terminal from other image capturing devices each provided in other sites, without generating a spherical image and a predetermine area image, according to the one of the embodiments.
FIG. 28B is illustration of another screen of the display in the one site, in which the display displays images after a spherical image and a predetermined area image are generated based on image data transmitted from other image capturing devices each provided in other sites, according to the one of the embodiments.
FIG. 28C is illustration of still another screen of the display in the one site, in which a predetermined area image of FIG. 28B is changed, according to the one of the embodiments.

Hereinafter, a description is given of a process of displaying an image in each site according to the present embodiment with reference to FIG. 27 to FIG. 28. In the following description, as one example of the process of displaying an image in a site, the smartphone 9 in the site B is used. FIG. 27 is a flowchart illustrating the process of displaying a captured image according to the present embodiment. FIG. 28A to FIG. 28C are illustrations of examples of a screen of a display in the site B.

The writing and reading unit 99 of the smartphone 9 refers to the image type management DB 9001 (see FIG. 16) using the image data ID received at S103 in the process illustrated in FIG. 26 as a search key, to search and read the image type information (source name) associated with the image data ID (S121).

Subsequently, the determination unit 95 determines whether the image type information read at S131 indicates "special image" or not (S122). When the image type information read at S131 indicates "special image" (S122: YES), the image and audio processing unit 93 generates a predetermined area image based on the captured image data (S123). Then, the display control unit 94 displays the predetermined area image corresponding to an image of the site A as illustrated in FIG. 28B (S124).

On the other hand, when the image type information indicates "general image", i.e., when the image type information is "Video" (S122: NO), the image and audio processing unit 93 does not generate a spherical image from the captured image data received at S103, and the display control unit 94 displays a general image (S125).

FIG. 28A is an illustration of a screen displayed in the site B, in which the screen includes an image based on captured image data transmitted from the image capturing device 1a of the site A via the videoconference terminal 3a, and another image based on captured image data transmitted from the image capturing device 1b of the site B, without generating a spherical image and a predetermine area image. On the other hand, FIG. 28B is an illustration of a screen displayed in the site B, in which the screen includes images that are displayed after a spherical image and a predetermined area image are generated based on the captured image data transmitted from the image capturing device 1a of the site A and the image capturing device 1b of the site B. In the example of FIG. 28A to FIG. 28C, an image of the site A is displayed in a left-side display area (layout number "1") of the display 4d, and an image of the site B is displayed in an upper-right display area (layout number "2"). Further, in a middle-right display area (layout number "3") of the display 4d, an image of the site C is displayed, and an image of the site D (own site) is displayed in a lower-right display area (layout number "4"). The display area having the layout number "1" is a main display area, and the display areas with the layout numbers "2", "3" and "4" are sub display areas. The image in the main display area and the image in the sub display area can be changed in each communication terminal. In genera an image having a main person in the video call is displayed in the main display area 1 at each site.

When the display control unit 94 displays the images based on the captured image data in a state as being transmitted from the image capturing device 1a and the image capturing device 1b, each of which can capture a spherical image, the images of the site A and the site B are displayed as illustrated in FIG. 28A, namely each image is displayed as a combination of a hemispherical image on the front side and a hemisphere image on the back side, as respectively illustrated in FIG. 3A and FIG. 3B.

On the other hand, when the image and audio processing unit 93 generates a spherical image based on the image data transmitted from the image capturing device 1a and the image capturing device 1b, each of which can obtain two hemispherical images, from which a spherical image is generated, and further generates a predetermined area image, the predetermined area image that is a planar image, is displayed as illustrated in FIG. 28B. In each example of FIG. 28A and FIG. 28B, the general image (planar image in the present embodiment) is displayed in the display areas of the site C and the site D, because the image capturing device 8 and the camera 312 built in the videoconference terminal 3d, each being an image capturing device that obtains a general image, are used in the site C and the site D, respectively.

Furthermore, a user is able to change the predetermined area corresponding to the predetermined area image in the same spherical image. For example, when the user B1 operates using the touch panel 921, the receiving unit 92 receives the user operation to shift the predetermined area image, and the display control unit 94 shifts, rotates, reduces, or enlarges the predetermined area image. Thereby, a default predetermined area image in which the user A1 and the user A2 are displayed as illustrated in FIG. 28B, is changeable to another predetermined area image as illustrated in FIG. 28C, for example. More specifically, in FIG. 28C, the predetermined area is changed from one including the users A1 and A2 to another one including the whiteboard 6, in the captured image of the site A as illustrated in FIG. 25B.

Note that celestial sphere icons 191 and 192 illustrated in FIG. 28B and 28C are examples of a special image identification icon indicating an image being displayed is a predetermined area image corresponding to the predetermined area T in a spherical image. The celestial sphere icons 191 and 192 are displayed in an upper right corner in the examples of FIG. 28B and FIG. 28C, however the disclosure is not limited to this and the celestial sphere icons 191 and 192 may be displayed at anywhere, for example in an upper left corner, a lower left corner, a lower right corner, instead of at the upper right. In addition, a type of the celestial sphere icons 191 and 192 are not limited to the one illustrated in FIG. 28B and FIG. 28C. Further, in alternative to or in addition to the celestial sphere icons 191 and 192, a character string such as "Spherical Image", or a combination of an icon and characters may be used.

<Process of Changing Display Image in Another Site>

Figure 29:
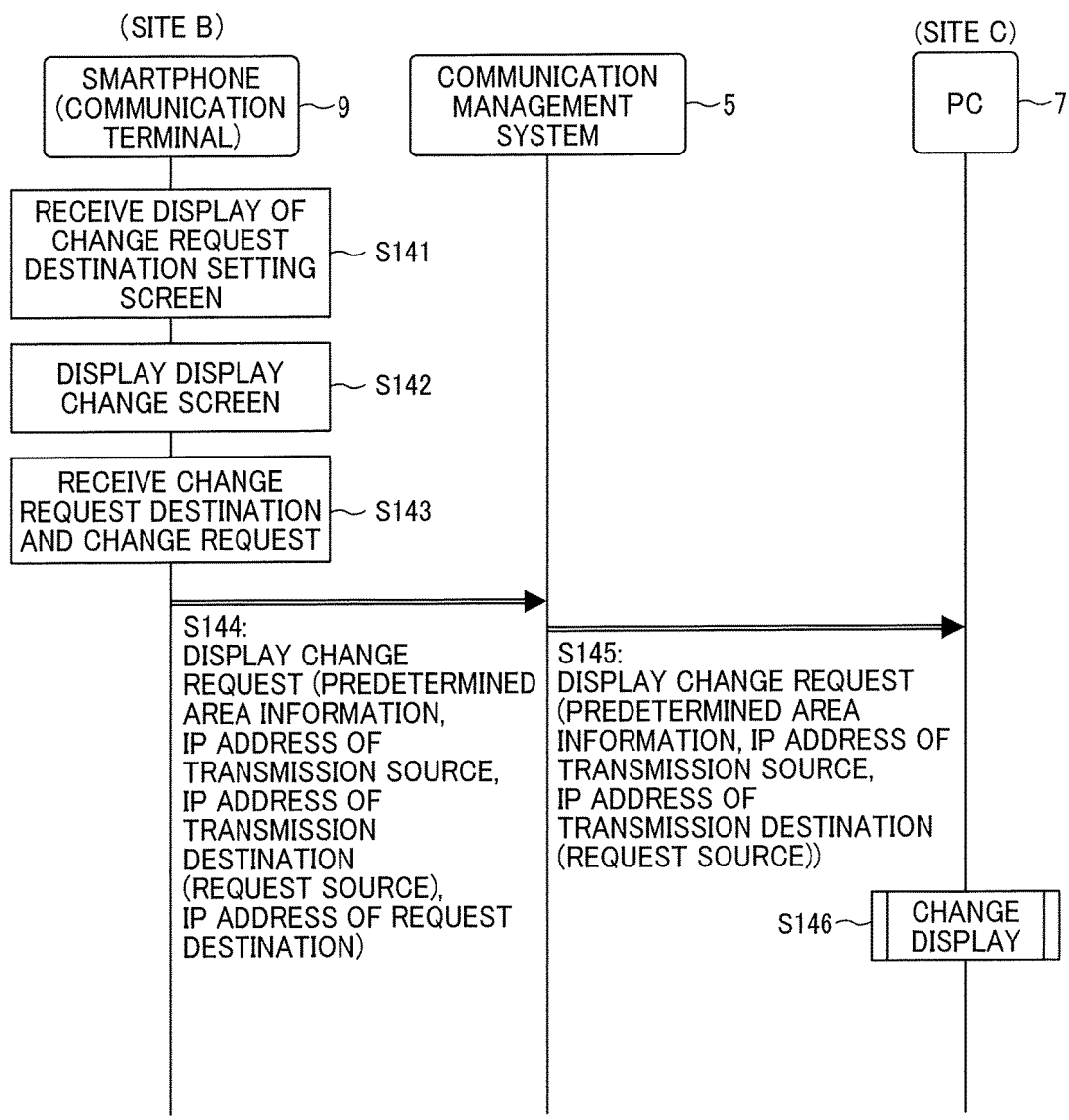
FIG. 29 is a sequence diagram illustrating a process of displaying, in another site, a predetermined image that is same as being displayed in an own site, according to the one of the embodiments.

Hereinafter, a description is given of a process of displaying in another site the same image as the predetermined area image being displayed in the own site, according to the present embodiment, with reference to FIG. 29 to FIG. 32. FIG. 29 is a sequence diagram illustrating a process of displaying, in another site, the same image as the predetermined area image being displayed in the own site, according to the present embodiment.

In the following description, a case where the predetermined area image including a whiteboard 6 as illustrated in FIG. 28C but not the user A1 in the site A is currently displayed and the user B1 in the site B wants other users in another site (for example, the cite C) to see the same predetermined area image including the whiteboard 6 is described.

Figure 30:
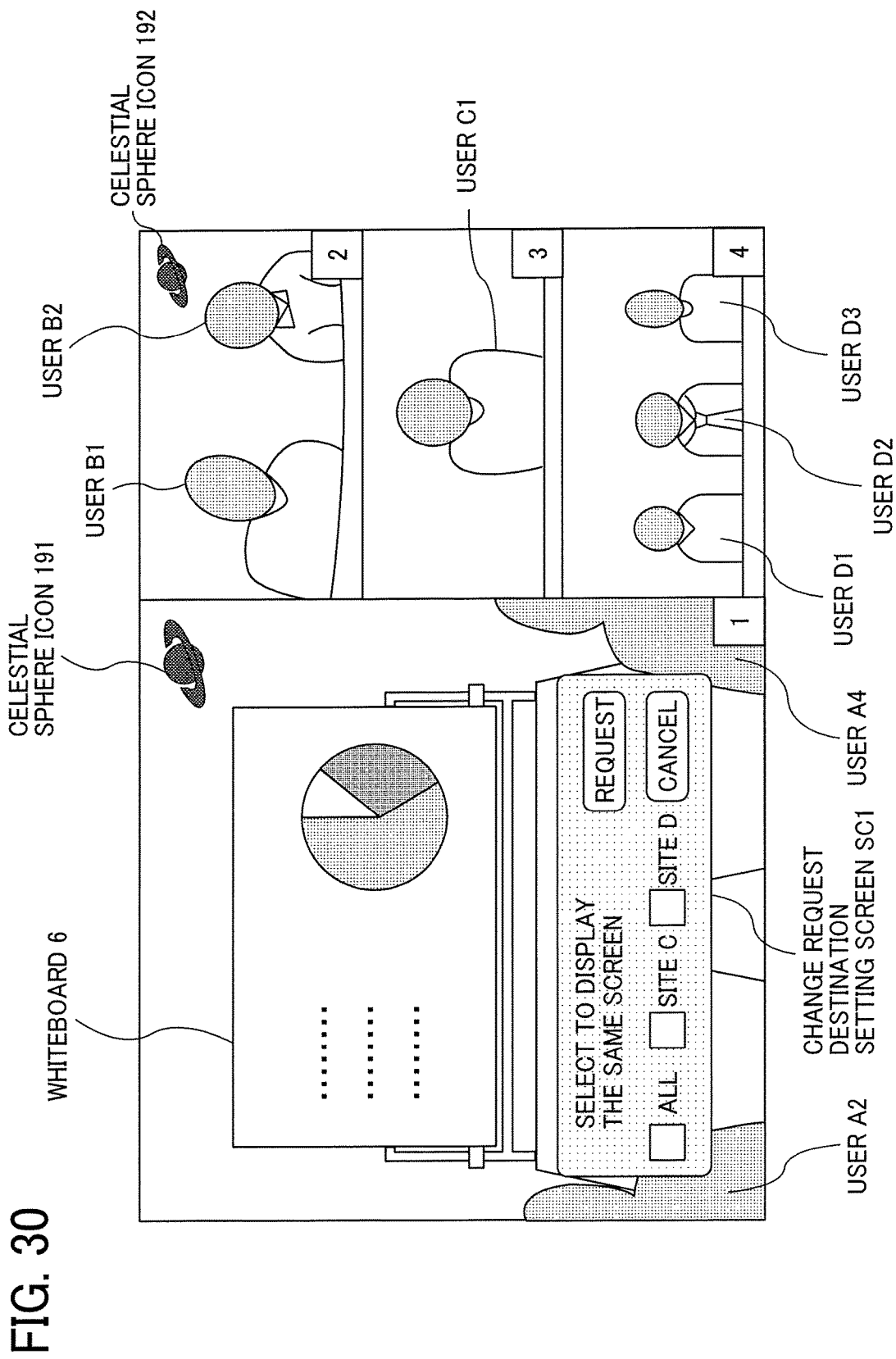
FIG. 30 is an illustration of still another screen of the display in the one site, in which a change request destination setting screen is displayed, according to the one of the embodiments.

When the user B1 in the site B operates the touch panel 921 to select a part corresponding to the predetermined area image to be shared with the site C, which is the image of site A among the images of the other sites illustrated in FIG. 28C, the receiving unit 92 receives a request to display a change request destination setting screen (S141). Then, the display control unit 94 displays a change request destination setting screen SC1 on the display 917, as illustrated in FIG. 30 (S142). The change request destination setting screen SC1 includes a message to guide the user to operate, a check box of a site name of a change request destination, a "request" button to execute the request, and a "cancel" button to stop the request. In addition, regarding a site name, a check box for "ALL" used to transmit the request to all the other sites is also displayed. An IP address of the transmission source terminal of the image type management table illustrated in FIG. 16 is associated with a corresponding site name in advance, and the display control unit 94 displays the site name based on the IP address.

When the user B1 checks a check box for a change request destination (in the example here, the site C) and press, namely click, the "request" button, the receiving unit 92 receives the change request destination and the change request (S143). Then, the transmission and reception unit 91 transmits first display change request information indicating the display change request to the communication management system 5 (S144). The first display change request information includes:

(a) the predetermined area information indicating the predetermined area image of the site A as illustrated in FIG. 30;

(b) the IP address of the communication terminal that is a transmission source of the captured image data being original data of the predetermined area image (in the example here, the IP address of the videoconference terminal 3a of the site A);

(c) the IP address of the communication terminal that is a transmission destination of the captured image data and also the transmission source of the display change request (in the example here, the IP address of the smartphone 9 of the site B); and (d) the IP address of the communication terminal that is a transmission destination of the display change request (in the example here, the PC 7 of the site C).

The transmission and reception unit 51 of the communication management system 5 receives the first display change request information.

Then, the transmission and reception unit 51 of the communication management system 5 transmits second display change request information based on the first display change request information to a destination that is indicated by (d) the IP address of the communication terminal that is a transmission destination of the display change request (in the example here, the PC7 of the cite C). The second display change request information includes:

(a) the predetermined area information indicating the predetermined area image of the site A illustrated in FIG. 30;

(b) the IP address of the communication terminal that is a transmission source of the captured image data being original data of the predetermined area image (in the example here, the IP address of the videoconference terminal 3a of the site A); and (c) the IP address of the communication terminal that is a transmission destination of the captured image data and also a transmission source of the display change request (in the example here, the IP address of the smartphone 9 of the site B).

The transmission and reception unit 71 of the PC 7 receives the second display change request information.

Figure 31:
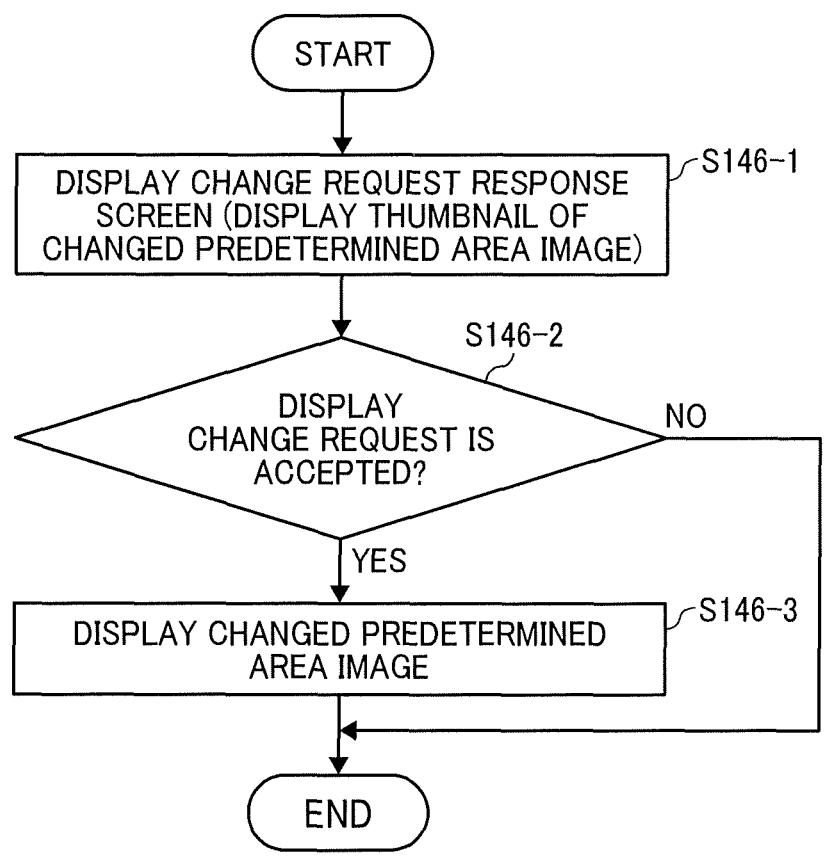
FIG. 31 is a flowchart of a process of changing contents of a screen displayed on the display, according to the one of the embodiments.
Figure 32:
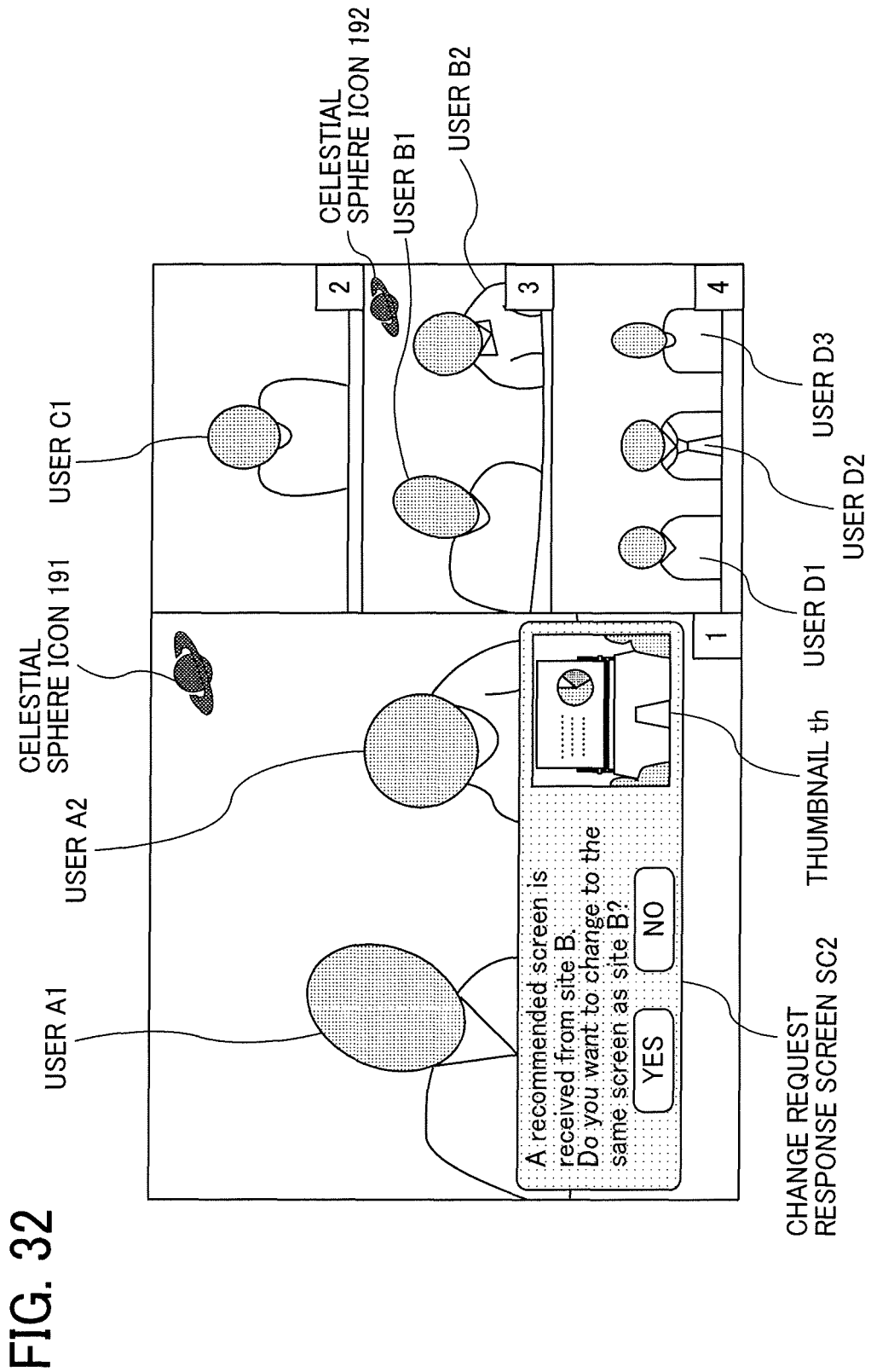
FIG. 32 is an illustration of a screen of the display in one site, in which a change request response screen is displayed, according to the one of the embodiments.

Then, the PC 7 performs display change processing based on the second display change request information (S146). Hereinafter, a detailed description is given of a process of performing the display change processing according to the present embodiment with reference to FIG. 31 and FIG. 32. FIG. 31 is a flowchart of the process of performing the display change processing according to the present embodiment. FIG. 32 is an illustration of the screen displayed in the site C.

First, the display control unit 74 of the PC 7 displays a change request response screen SC2 as illustrated in FIG. 32. The change request response screen SC2 displays an inquiry message asking whether or not to change the screen to the same screen as the display change request source, a thumbnail th for displaying the changed image, and an "YES" button to be clicked or pressed to accept the display change request, and a "NO" button to be clicked or pressed to reject the display change request. In this case, the display control unit 74 specifies an area to display the change request response screen SC2 based on (b) the IP address of the communication terminal that is a transmission source of captured image data being original data of the predetermined area image (in the example here, the IP address of the videoconference terminal 3a of the site A) received at S145 and the image type management DB 7001. In addition, the display control unit 74 displays a message using (c) the IP address of the communication terminal that is a transmission destination of the captured image data and also a transmission source of the display change request (in the example here, the IP address of the smartphone 9 of the site B) and the site name associated with the IP address of the transmission source terminal of the image type management table illustrated in FIG. 16. Further, the display control unit 74 generates the thumbnail th based on (b) the IP address of the communication terminal that is a transmission source of the captured image data being original data of the predetermined area image (in the example here, the IP address of the videoconference terminal 3a of the site A), and (a) the predetermined area information indicating the predetermined area image of the site A illustrated in FIG. 30 in the whole image corresponding to the captured image specified by the image type management DB 7001. As a result, the user C1 in the site C can check the thumbnail th and determines whether or not to accept the display change request transmitted from the smartphone 9 of the site B.

When the user C1 clicks or presses the "YES" button to accept the display change request transmitted from the smartphone 9 of the site B (S146: YES), the display control unit 74 displays the changed predetermined area image based on information used in generating the thumbnail th (S146-3). As a result, a predetermined area image of the site A, as illustrated in FIG. 30, as the same image as displayed in the site B is displayed in the site C as well. On the other hand, when the user C1 clicks or presses the "NO" button (S146: NO) to reject the display change request transmitted from the smartphone 9 of the site B, the predetermined area image of the site A is not changed.

In the present embodiment described above, the smartphone 9 of the site B receives the captured image data from the videoconference terminal 3a of the site A and uniquely processes the image data to be displayed, and transmits the display change request information to the PC 7 of the site C via the communication management system 5, however the disclosure is not limited to this. For example, the videoconference terminal 3a of the site A may transmit the display change request information to another site, for example the PC 7 of the site C, via the communication management system 5 to display the same predetermined area image of the site A being displayed by the own terminal (videoconference terminal 3a) in the other site. This is beneficial when there is a speaker in the site A and there are listeners in other sites B, C, and D.

<<Effects of Embodiment>>

As described above, the communication terminal, such as the videoconference terminal 3a, according to the present embodiment, generates a spherical image and a predetermined area image based on an image data ID transmitted with image data not to display the front side-hemispherical image and the back side-hemispherical image as illustrated in FIG. 28A.

In addition, even in the case where the communication terminal in each site independently determines to display the predetermined area image, the users can communicate well each other among the plurality of sites, because the same predetermined area image can be displayed in the plurality of sites by transmitting a display change request from one of the plurality of sites to the other ones of the plurality of sites (see S144 and S145).

In the present embodiment described above, the display control unit 74 displays the change request response screen SC2 in the left side area of the left layout number 1 (here, in the display area of the image of the site A) as illustrated in FIG. 32, however, the disclosure is not limited to this and the change request response screen SC2 may be displayed in another display area having another layout number. In this case, because the display control unit 74 can display the change request response screen SC2 without the IP address of the communication terminal which is a transmission source of the data representing the captured image (whole image), the transmission and reception unit 91 may not have to transmit the IP address of the transmission source of the data representing the whole image in S144.

Further, in the present embodiment described above, as illustrated in FIG. 32, the display control unit 74 displays a message indicating that the image is a recommended image recommended by the site B, but the site name of the request source may not be displayed. In this case, because the display control unit 74 displays the message indicating that the image is a recommended image recommended, in the example, by the site B without the IP address of the communication terminal which is the transmission destination of the data representing the captured whole image (and the source of the display change request), the transmission and reception unit 91 may not have to transmit the IP address of the transmission destination of the data representing the whole image (and the source of the display change request) in S144.

In the present embodiment described above, as an example of a spherical image, the captured image (whole image) is used as a three-dimensional spherical image, but a two-dimensional panoramic image may also be used. Additionally, in this disclosure, the spherical image does not have to be the full-view spherical image. For example, the spherical image may be the wide-angle view image having an angle of about 180 to 360 degrees in the horizontal direction. It is desirable that the spherical image is image data having at least a part that is not entirely displayed in the predetermined area T.

In the present embodiment described above, the communication management system 5 relays the predetermined area information transmitted from each communication terminal. However, the present disclosure is not limited to this, and each of the communication terminals may directly transmits or receives the predetermined area information to another one of the communication terminals.

Each of the functions of the above-described embodiments may be implemented by one or more processing circuits or circuitry. Processing circuitry includes a programmed processor, as a processor includes circuitry. A processing circuit also includes a device such as an application specific integrated circuit (ASIC), digital signal processor (DSP), field programmable gate array (FPGA), and conventional circuit components arranged to perform the recited functions. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A communication terminal, comprising:
   circuitry configured to
      control a display to display a predetermined area image which is a part of a whole image, the whole image being shared with another communication terminal;
      receive a request to display a destination setting screen;
      receive, in response to a user input based on the destination setting screen, a request to change a destination terminal to be the another communication terminal and a destination terminal identifier that identifies the another communication terminal; and
      transmit display change information to be received by the another communication terminal, wherein
   the display change information includes an identifier of the communication terminal, the destination terminal identifier and predetermined area information, and
   the predetermined area information indicates a predetermined area associated with the predetermined area image.

2. The communication terminal of claim 1, wherein the circuitry is configured to control the communication terminal to operate as one of a videoconference terminal, a personal computer, a smartphone, a digital television, a smartwatch, and a car navigation system.

3. An image communication system, comprising:
   the communication terminal of claim 1; and
   the another communication terminal, wherein
      the another communication terminal is communicably connected to the communication terminal.

4. The image communication system of claim 3, wherein the another communication terminal is configured to control another display to display the predetermined area image, which is the part of the whole image shared by the communication terminal, according to the predetermined area information transmitted by the communication terminal.

5. The image communication system of claim 3, wherein the another communication terminal is configured to control another display to display a thumbnail based on a predetermined area in the whole image shared by the communication terminal, the predetermined area being indicated by the predetermined area information transmitted by the communication terminal.

6. The communication terminal of claim 1, wherein the display change information includes an identifier of a source of captured image data related to the whole image.

7. The communication terminal of claim 1, wherein the display change information includes an identifier of a source of captured image data related to the predetermined area image.

8. The communication terminal of claim 1, wherein the identifier of the communication terminal is an IP address of the communication terminal 9. The communication terminal of claim 1, wherein the destination terminal identifier is an IP address of the another communication terminal.

10. An image communication system, comprising:
   a first communication terminal; and
   a second communication terminal,
   the first communication terminal includes first circuitry configured to
      control a display to display a predetermined area image which is a part of a whole image, the whole image being shared with the second communication terminal,
      receive a request to display a destination setting screen;
      receive, in response to a user input based on the destination setting screen, a request to change a destination terminal to be the second communication terminal and a destination terminal identifier that identifies the second communication terminal; and
      transmit display change information to be received by the second communication terminal, the display change information including an identifier of the communication terminal, the destination terminal identifier and predetermined area information, and the predetermined area information indicating a predetermined area associated with the predetermined area image, and
   the second communication terminal includes second circuitry configured to
      receive the display change information transmitted from the first circuitry, and
      control a second display to display the predetermined area image corresponding to a predetermined area in the whole image shared by the first communication terminal.

11. A communication method, comprising:
   controlling, by a communication terminal, a display to display a predetermined area image which is a part of a whole image, the whole image being shared with another communication terminal;
   receiving a request to display a destination setting screen;
   receiving, in response to a user input based on the destination setting screen, a request to change a destination terminal to be the another communication terminal and a destination terminal identifier that identifies the another communication terminal; and
   transmitting display change information to be received by the another communication terminal, wherein
   the display change information includes an identifier of the communication terminal, the destination terminal identifier and predetermined area information, and
   the predetermined area information indicates a predetermined area associated with the predetermined area image.

12. A non-transitory recording medium storing a plurality of instructions which, when executed by one or more processors, cause the processors to perform the method of claim 11.

* * * * *